United States Patent [19]

Maurer et al.

[11] Patent Number: 5,048,076
[45] Date of Patent: Sep. 10, 1991

[54] CONTROL APPARATUS FOR AN AUTOMATED TELEPHONE ATTENDANT

[76] Inventors: David L. Maurer, 151 Park Ave., Randolph, N.J. 07869; Evan H. Sohn, 197 Maple St., Englewood, N.J. 07631; Robert D. Entwisle, 18 Fern Ave., Wharton, N.J. 07885

[21] Appl. No.: 464,869

[22] Filed: Jan. 16, 1990

[51] Int. Cl.[5] .......................................... H04M 11/00
[52] U.S. Cl. ..................................... 379/94; 379/102
[58] Field of Search ................. 379/94, 102, 104, 105, 379/179, 180, 373, 372, 375, 376

[56] References Cited

U.S. PATENT DOCUMENTS

| | | | |
|---|---|---|---|
| 4,560,837 | 12/1985 | Carson et al. | 379/373 |
| 4,567,330 | 1/1986 | Curtin | 379/373 |
| 4,578,540 | 3/1986 | Borg et al. | 379/102 |
| 4,675,899 | 6/1987 | Ahuja | 379/180 |
| 4,696,028 | 9/1987 | Morganstein et al. | 379/88 |
| 4,701,949 | 10/1987 | Lynch et al. | 379/179 |
| 4,701,950 | 10/1987 | Curtin et al. | 379/214 |
| 4,741,024 | 4/1988 | Del Monte et al. | 379/181 |
| 4,783,796 | 11/1988 | Ladd | 379/67 |
| 4,788,714 | 11/1988 | Hashimoto | 379/102 |
| 4,809,321 | 2/1989 | Morganstein et al. | 379/211 |
| 4,821,312 | 4/1989 | Horton et al. | 379/104 |
| 4,850,012 | 7/1989 | Mehta et al. | 379/157 |
| 4,910,764 | 3/1990 | Bowen | 379/100 |
| 4,939,772 | 7/1990 | Goto | 379/102 |

OTHER PUBLICATIONS

"The Choice" Users Manual, Northwestern Bell Phones, pp. 1-38.
"The Missing Link", Advertisement brochure of Multi--Link Inc. of Lexington, KY.
"The Fax Line Manager", Advertisement brochure of TCI, Technology Concepts Inc.

Primary Examiner—Jin F. Ng
Assistant Examiner—Stella L. Woo
Attorney, Agent, or Firm—Frishauf, Holtz, Goodman & Woodward

[57] ABSTRACT

Automated telephone attendant equipment involving a technique for connecting an incoming call on an external line to one out of a plurality of telephone devices. Each telephone device is connected in an internal line branching off from the external line. A main control box is placed in an internal line. After it senses a ring on the external line, it processes an incoming identification signal, such as is characteristic of a facsimile transmission, for example, which contains information as to which particular telephone device is to be accessed. The main control box then generates a ringback signal which not only notifies the caller that the extension desired is ringing, as is conventional, but also contains a coded signal unique to the telephone device of interest. A local control box is provided in each internal line to normally block signals from passing to the telephone device from the external line. This local control box detects the coded ringback signal from the main control box and compares it with the code preassigned to itself. If a match is found, the local control box connects its corresponding telephone device to the external line.

30 Claims, 24 Drawing Sheets

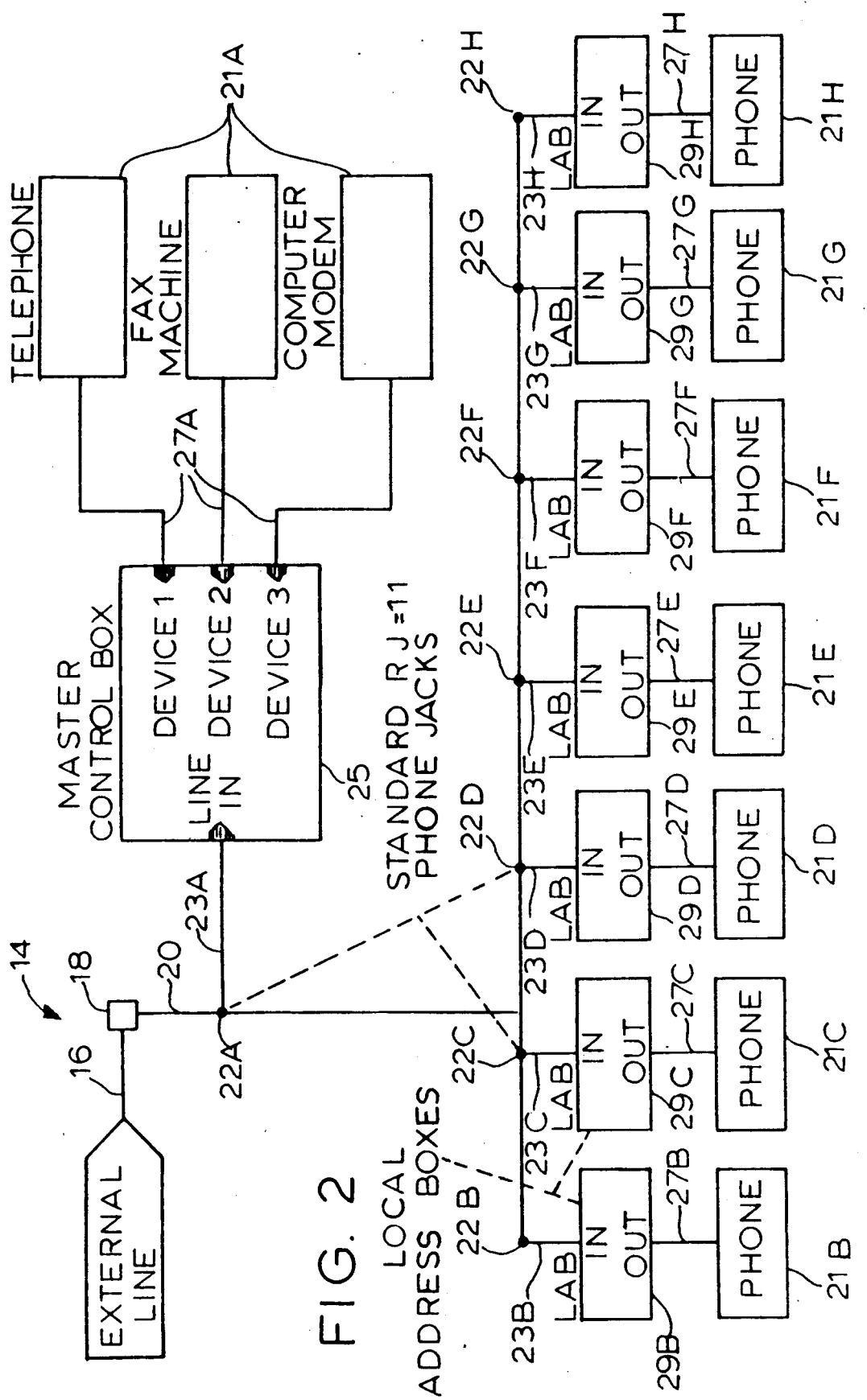

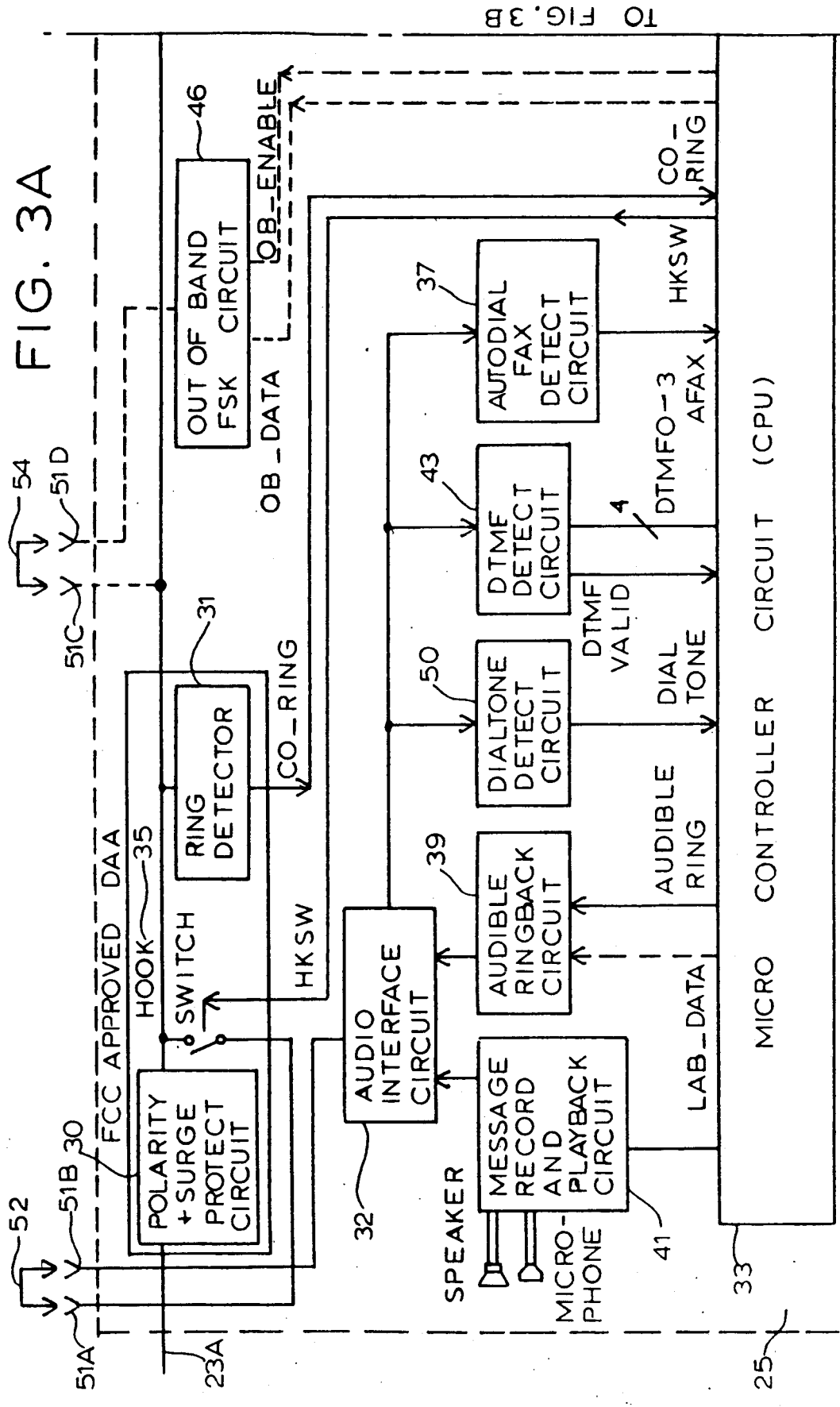

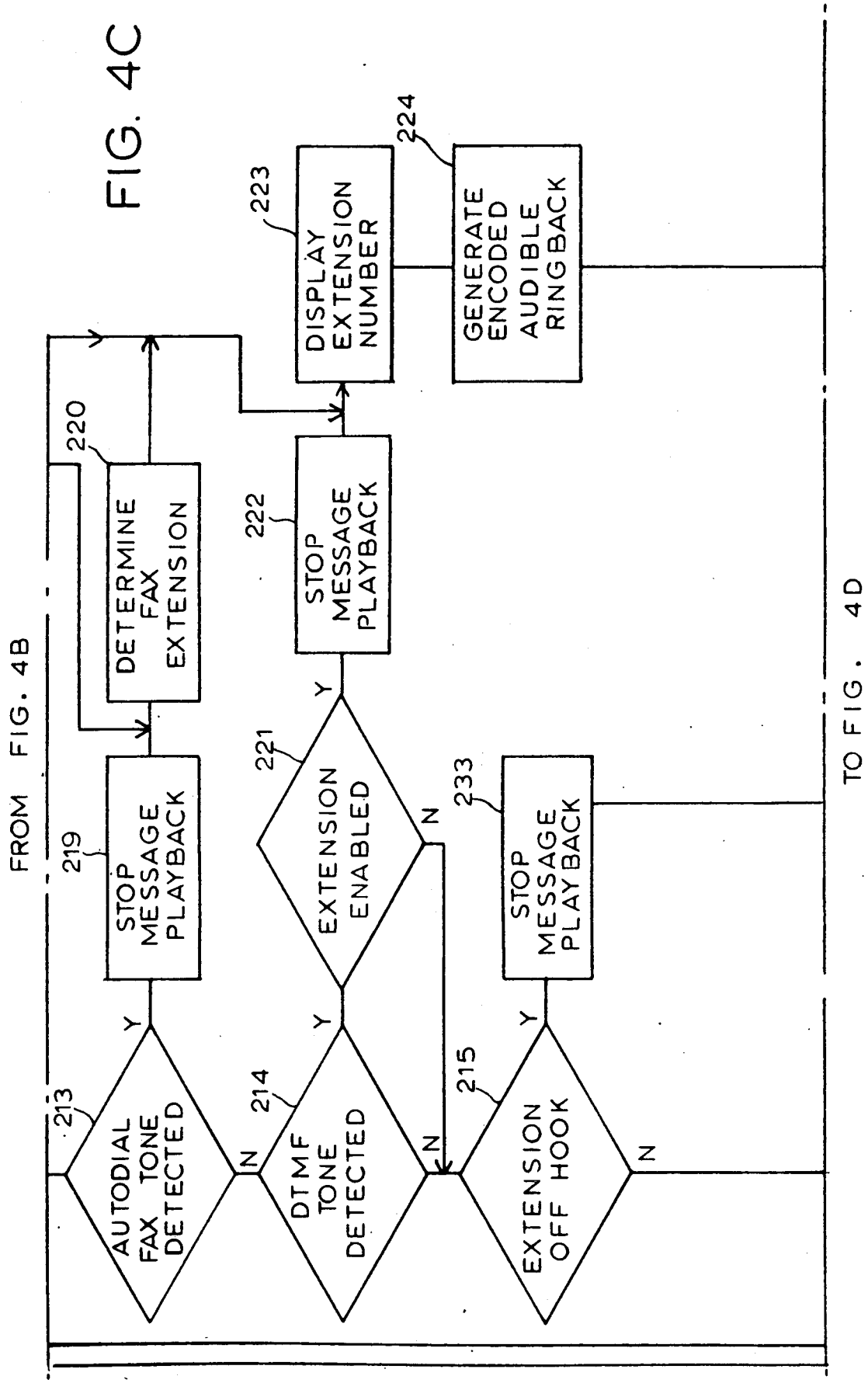

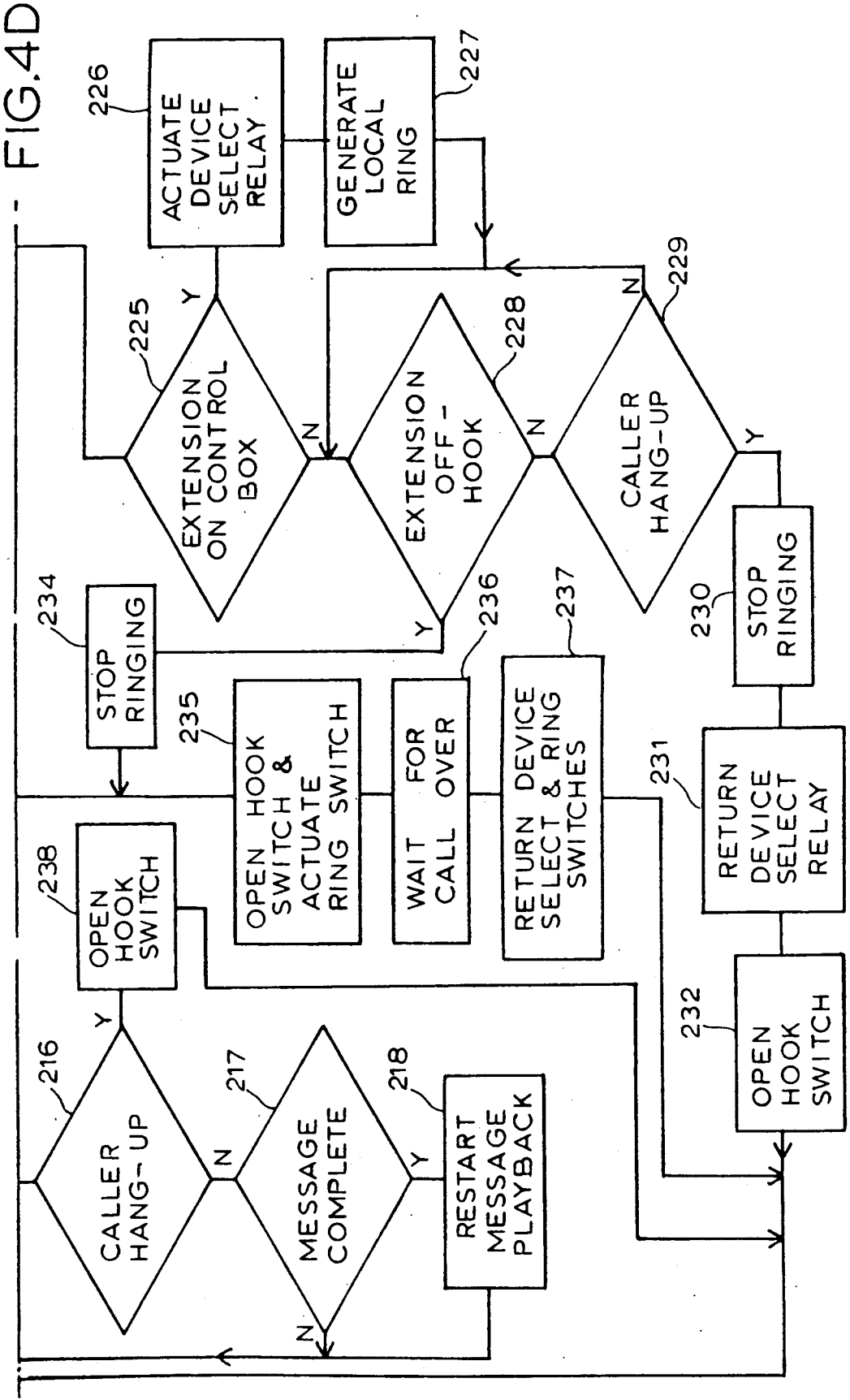

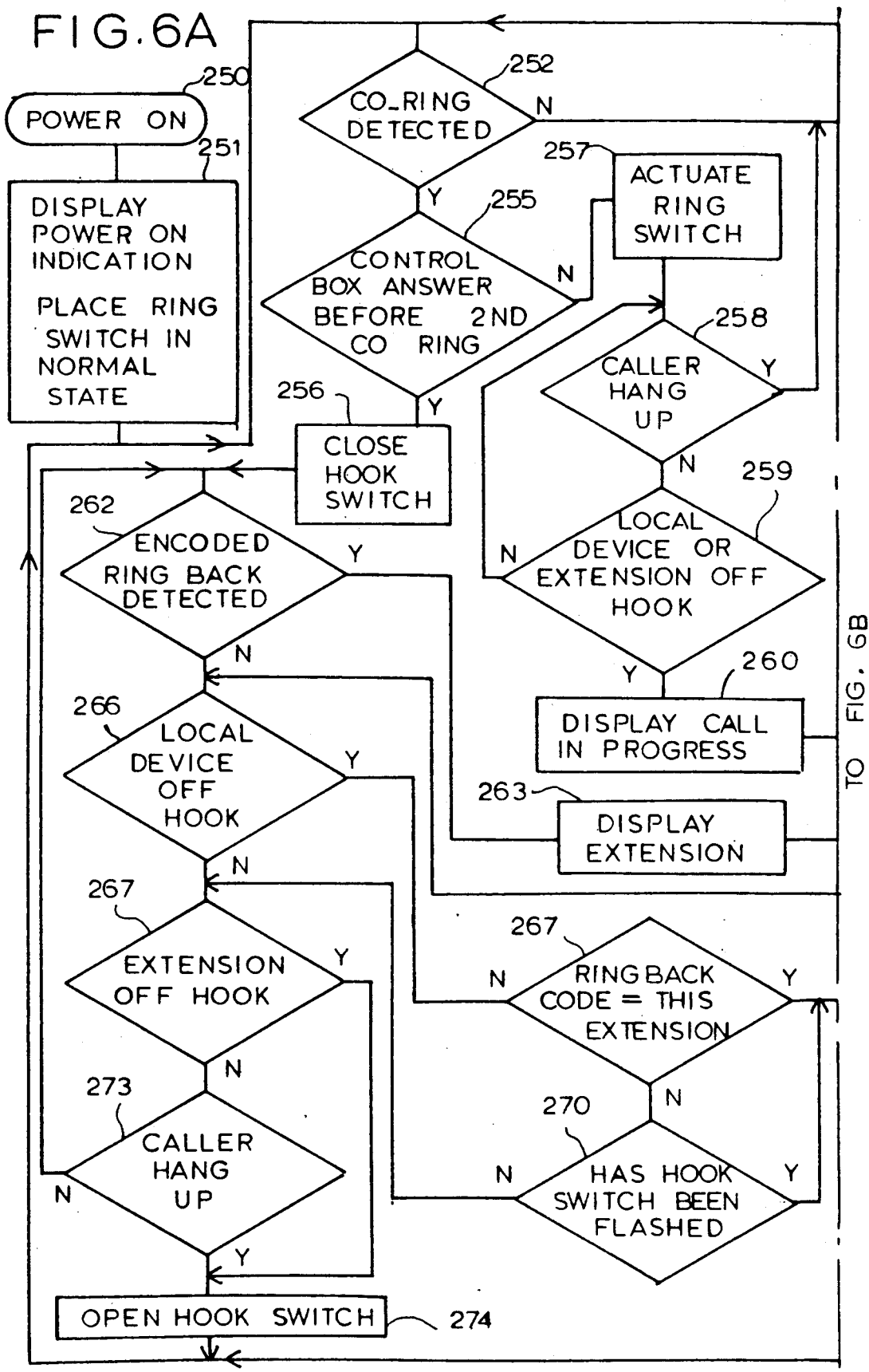

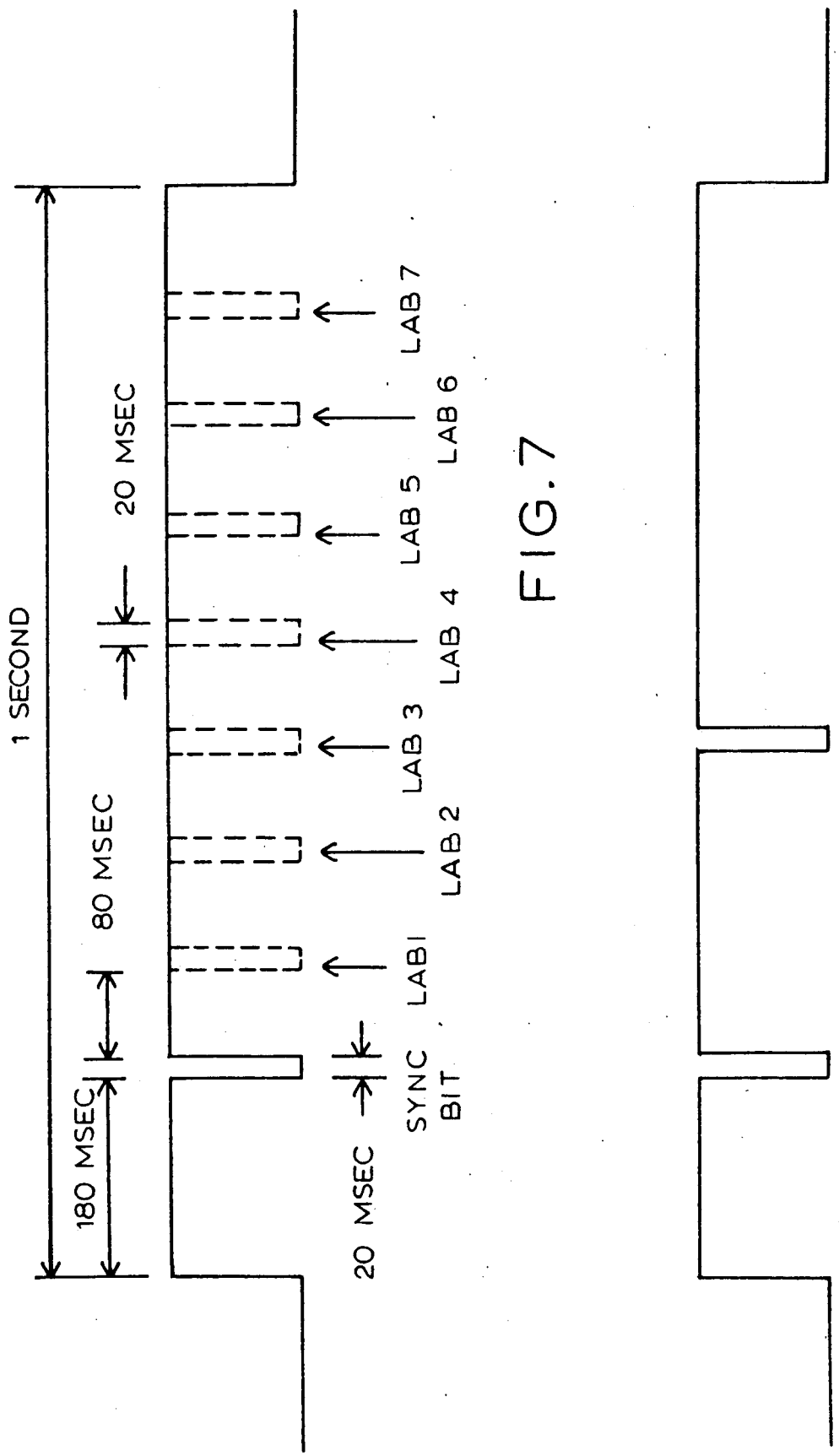

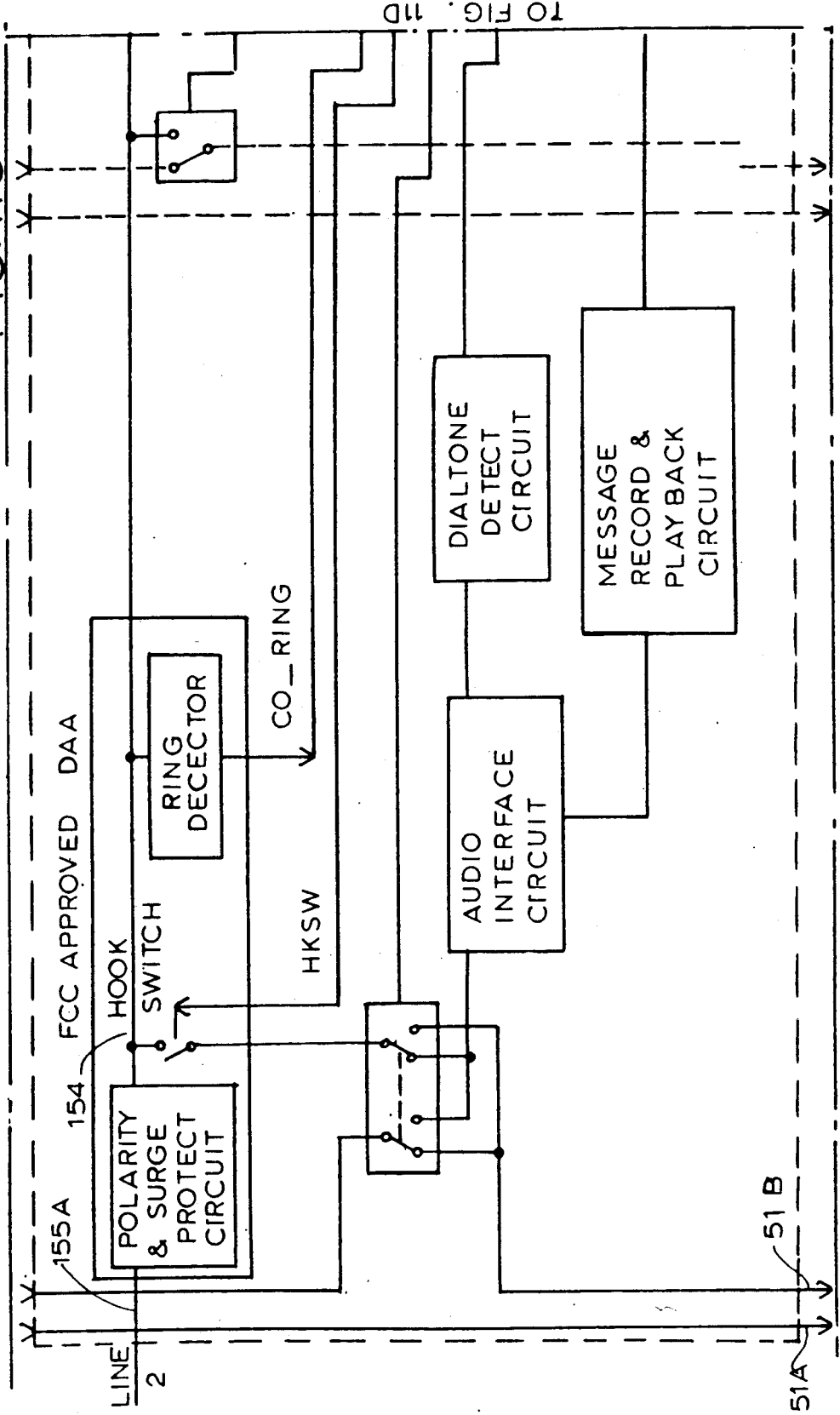

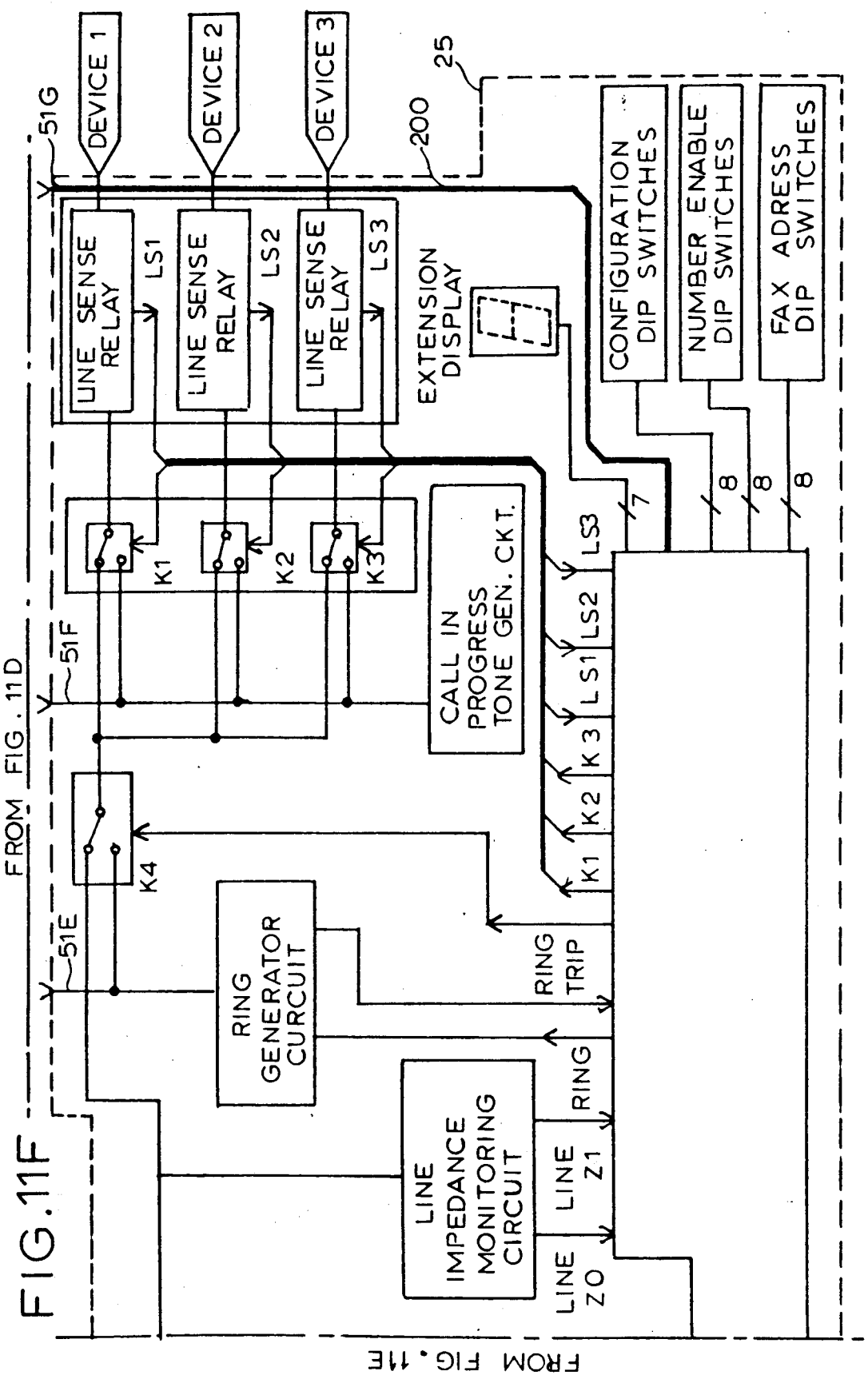

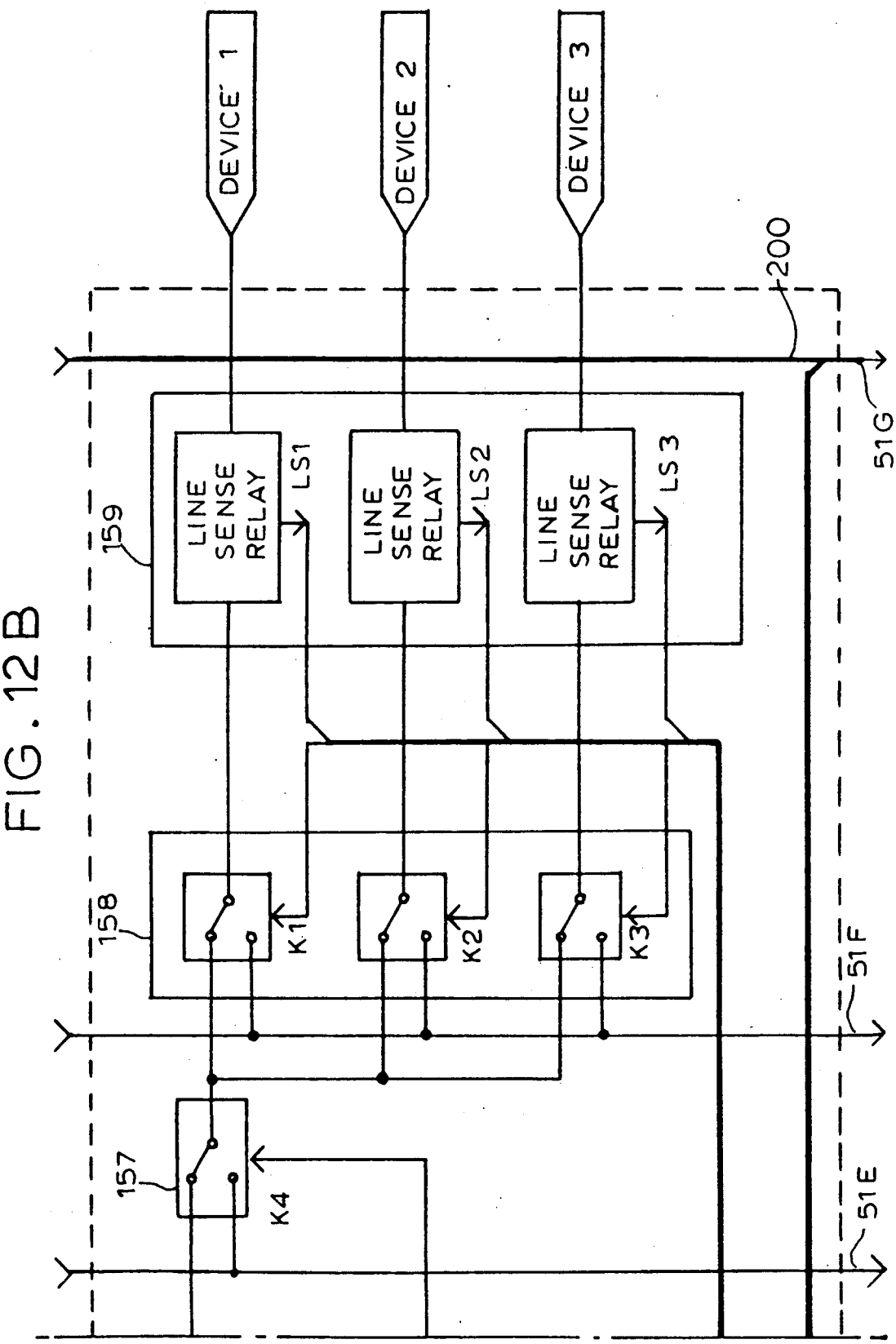

CONTROL APPARATUS FOR AN AUTOMATED TELEPHONE ATTENDANT

BACKGROUND OF THE INVENTION

The present invention relates to automated telephone attendant equipment and, more particularly, to a telephone switching arrangement having one or more external lines coming into a site and a plurality of telephone devices on site in which the switching function connecting an external line to a desired device is accomplished automatically.

Automated telephone attendant ("ATA" hereafter) equipment has, in the past, involved devices primarily intended to be used in conjunction with PBX and CENTREX type systems to automatically answer incoming calls and direct the caller with voice prompts to push buttons on his telephone to route his call to the desired extension. As such, ATA equipment has made a significant impact on the way large companies handle incoming phone calls while smaller companies, i.e. those with one or two external phone lines, have been unable to take advantage of this new technology in a practical, cost effective way. It is apparent that there exists a need for a device to provide the functionality of the ATA, which currently costs $5,000 and up, but designed so as to be practical for small businesses and even for home users, as discussed below.

A single external phone line served in the past to provide adequate telephone service for small businesses and homes. With the relatively recent explosion in popularity of the facsimile (fax hereinafter) machine, this single line must now handle fax transmissions as well as the normal telephone traffic. This presents the called party with a problem in that he does not know if an incoming phone call is for the fax machine or not. Therefore, fax machines which must share a single phone line with other telephone devices are normally turned off, thus disabling automatic reception of faxes. Consequently, upon receiving a telephone call, the receiving party must manually determine whether the call is for the fax machine. These fax transmissions will be one of two types, namely, autodial or manual.

In the case of an "autodial fax" transmission, the receiving party must recognize the sending fax tone (typically a 1080Hz tone with a duration of some 500 msec every 4 seconds) and upon recognition of this tone he must activate his fax machine to receive the incoming fax. The time required to pick up the receiver and determine that the signal being received is an "autodial fax" tone often interferes with the successful handshaking of the two machines.

In the case of a "manual fax" transmission, the calling party gets on the line and tells the receiving party that he wishes to send a fax. The receiving party must first activate his fax machine, and the calling party then begins his fax transmission. Alternatively, the caller will often call the receiving party to alert him that the caller would like to send a fax (either autodial or manual). The two parties terminate the call, and the receiving party then activates his fax machine. The caller will subsequently initiate the fax transmission with a second call. When the phone rings, the receiving party does not answer his telephone presuming that it is the calling party's fax on the other end. This presents a potential problem in that the second incoming call may be an intervening call from someone else which, consequently, will be answered by the receiving party's fax machine. In any event, the receiving party must be present since his interaction is required to receive any fax transmissions. Such an arrangement is inconvenient to the receiving party who is tied down to be close to the fax machine, and it is also inconvenient to the calling party if the fax machine is left off when the receiving party is away. Furthermore, with the prior art approach, if any extension phone is picked up while a fax transmission is in progress, the resulting fax may be garbled.

In order to overcome the above-described inconveniences, two separate external lines can be installed, with one being for normal telephone traffic and the other being dedicated to the fax. However, this is an extra expense which preferably is avoided by a small business or a home user. Moreover, machines other than a fax have also come into common use in the small business environment. For example, the communication by telephone via modems between computers is growing in popularity. Therefore, perhaps a third external line would be required to handle this computer communication. Certainly, the additional expense of a further dedicated line or lines is preferably avoided by a small business. Consequently, a need exists to switch an incoming call on the external line to the appropriate telephone device (this term will be used hereinafter as inclusive of all telephone sets, machines, devices, systems, modems, etc., that can receive and/or transmit information via a telephone line) that is connected at one of the extensions.

Another difficulty faced by a small business is the unfavorable impression that is possibly created in the mind of a calling party when the person who picks up at the other end is the president of the small business rather than a receptionist or secretary. This occurrence immediately implies that the organization at the other end is a small business. Sometimes it is advantageous to avoid making such an impression, certainly as a first impression, since it is well known that company image can play a vital role in corporate success and growth. One answer to the lack of a secretary could be an ATA which transmits to the calling party a recorded audio message starting with a greeting and conveying appropriate information and instructions. However, such a system is typically rather expensive, as explained above, and few small businesses can afford one.

Various systems are currently available that have been designed for use with a single external line to connect incoming calls automatically to the desired telephone device on one of the several extensions. Examples of such systems are The Choice from Northwestern Bell Phones, The Missing Link from Multi-Link Inc. of Lexington, Kentucky, and The Fax Line Manager from Technology Concepts, Inc. of Belmont, Calif. However, as shown in FIG. 1, these systems utilize a control apparatus 1 that must have a control line 3 connected between it and the telephone device 5 that it controls. If the control apparatus is in proximity to the telephone devices that it controls, running these control lines poses little inconvenience. For example, Northwestern Bell Phones provides three 7' cords for this purpose. However, if the fax, computer, and telephone sets on various extensions are spread throughout the office or home, the installation requires a considerable amount of wiring which clearly is not only an inconvenience but also an added expense. Also, installation of the control apparatus may require some rewiring of the jack to which it is coupled. Consequently, moving control apparatus 1 to one room after it has been installed in another is troublesome.

SUMMARY OF THE INVENTION

It is the primary object of the present invention to provide an ATA system to automatically direct an incoming call on one or more external telephone lines to one or many desired telephone devices out of a plurality of telephone devices connected to the same external line.

A more specific object of the present invention is to provide a controlling apparatus to control which telephone devices out of a plurality of telephone devices connected to the same external line will ring upon receipt of an incoming telephone call.

A further object of the present invention is to provide a receiving apparatus to be connected between the external line and any telephone device the purpose of which is to prevent the telephone device from ringing in response to the central office ring signal and instead ring in response to a control signal from the aforementioned controlling apparatus.

One other object of the present invention is to provide an exclusionary apparatus to prevent one telephone device out of a plurality of telephone devices connected to the same external line from gaining inadvertent access to the external line when another telephone device is already using the external line.

Yet another object of the present invention is to provide an ATA system that requires no running of special wires between a control box and the telephone devices.

Still another object of the present invention is to provide a controlling apparatus that can readily be moved from one room to another without requiring rewiring of jacks or of any connections between the controlling apparatus and the telephone devices.

A still further object of the present invention is to provide an ATA system which will enable the called party to know which extension the caller has requested prior to the called party answering the call.

These and other objects are attained by the present invention one aspect of which is directed to a telephone switching apparatus for coupling an external telephone line to a particular telephone device out of a plurality of telephone devices connected in, respectively, a plurality of internal telephone lines branching from said external line. This apparatus comprises switch means in each of the internal lines for selectively blocking passage of signals between the external line and the plurality of telephone devices. A control means is provided in one of the internal lines for (a) detecting a ring signal on the external line, (b) responding to identification signals on the external line to identify the particular telephone device, and (c) generating a ringback signal including a selection signal unique to the particular telephone device. A further means in said internal lines is coupled to the switch means and is responsive to the selection signal in the ringback signal for generating a switching signal, the switch means being responsive to the switching signal for passing signals between the external telephone line and the particular telephone device through the switch means.

Another aspect of the invention is directed to a telephone switching apparatus for coupling an external telephone line to a particular telephone device out of a plurality of telephone devices connected in, respectively, a plurality of internal telephone lines branching from the external line. This apparatus comprises control means connected in one of the internal lines for responding to a normal ring signal on the external line and to an identification signal on the external line, for generating respectively unique selection signals to at least two telephone devices in remaining ones of the plurality of internal lines; and connecting means in the remaining ones of the plurality of internal lines coupled between respective telephone devices and the external line for normally blocking signals on the internal line received from the external line from reaching the respective telephone devices, and for responding to the selection signal for passing signals from the external line via the internal line to the particular telephone device.

Yet another aspect of the present invention is directed to a switching method in a telephone system for coupling an external telephone line to a particular telephone device out of a plurality of telephone devices connected in, respectively, a plurality of internal telephone lines branching from the external line, comprising the steps of: selectively blocking passage of signals between the external line and the plurality of telephone devices; detecting a ring signal on the external line; responding to identification signals on the external line to identify the particular telephone device; generating a ringback signal including a selection signal unique to the particular telephone device; and generating a switching signal in response to the selection signal in the ringback signal for enabling passage of signals between the external telephone line and the particular telephone device.

One other aspect of the present invention is directed to a switching method in a telephone system for coupling an external telephone line to a particular telephone device out of a plurality of telephone devices connected in, respectively, a plurality of internal telephone lines branching from the external line, comprising the steps of: responding to a normal ring signal on the external line and to an identification signal on the external line, for generating respectively unique selection signals to at least two telephone devices in remaining ones of the plurality of internal lines; and normally blocking signals on the internal line received from the external line from reaching the respective telephone devices, and responding to the selection signal for passing signals from the external line via the internal line to the particular telephone device.

BRIEF DESCRIPTION OF THE DRAWINGS

FIG. 2 is a schematic block diagram depicting the major components of the present invention including one master control box and several local address boxes ("LAB"s hereafter) coupled, respectively, to, the telephone devices on the extensions.

FIGS. 3A and 3B are schematic block diagrams showing details of the master control box.

FIGS. 4A to 4D are flow charts for describing the operation of the master control box.

FIG. 7 is a timing diagram depicting an encoded audible ringback signal.

FIG. 7A is a timing diagram depicting an encoded audible ringback signal for ringing a specified address.

DETAILED DESCRIPTION OF THE PREFERRED EMBODIMENT

Figure 1:
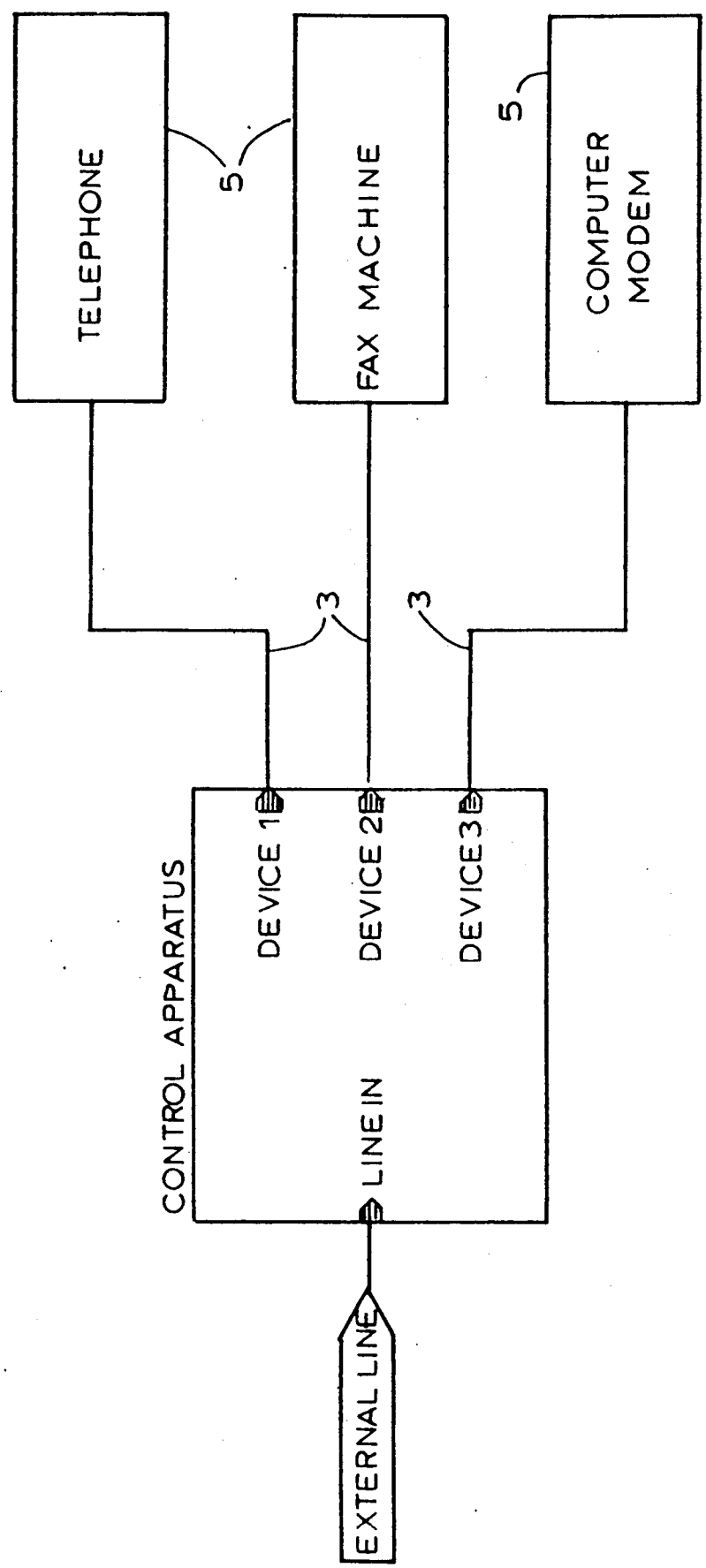
FIG. 1 is a block diagram of a prior art switching system for automatically connecting a single external line to one of the plurality of extensions.

For the sake of clarity, a single line implementation of the present invention is described first. System 10 of the present invention is shown in FIG. 2 as being coupled to external line 12 which extends between the central office of the telephone company (not shown) and the site 14 of the small business or home in which system 10 is installed. This is a standard telephone line over which signals are transmitted in the conventional fashion, including voice, data and ring signals. Thus, line 16 is the terminus of external line 12 within site 14. Line 16 is terminated at a typical junction box 18. Wiring 20 runs from junction box 18 throughout the site to the various rooms and telephone jacks they contain. Wire 20 is an internal continuation within the site of the external line 12. Telephone devices 21A-21H are connected, respectively, to RJ11 jacks 22A-22H installed throughout the site. Lines 23A-23H connect telephone devices 21A-21H, respectively, to their corresponding jack. Lines 23A-23H can be considered as extensions, or internal lines, and they are so referred to hereinbelow.

In accordance with one aspect of the present invention, control box 25 is connected to any of jacks 22A-22H which is most convenient for the user. Control box 25 is connected between cord 23A and telephone device 21A. In other words, cord 23A is pulled out from telephone device 21A and is, instead, connected to control box 25. Then, a cord 27A is connected from control box 25 to telephone device 21A. The circuit details and the operation of control box 25 are provided below.

Each of the other cords 23B-23H is likewise disconnected from its corresponding telephone device 21B-21H. In order to simplify the immediately following discussion, only the "B" branch will be discussed, although the explanation applies equally to any of the other extensions. The end of wire 23B which was pulled from telephone device 21B, is, instead, connected to a local address box ("LAB" hereinafter) 29B. Then, LAB 29B is connected by cord 27B to telephone device 21B. The details of LAB 29B and how it operates in conjunction with control box 25 are provided below. Briefly, however, control box 25 receives the normal incoming ring from external line 12 while, at the same time, LAB 29B blocks this ring from reaching telephone device 21B. In response to this incoming ring, control box 25 goes off hook to answer the incoming call and begins to listen for an AUTODIAL FAX TONE or a DTMF tone and, after a two second delay, sends a prerecorded audio message on external line 12 that informs the calling party of what action he needs to take to reach the desired extension. When that action is taken by the caller, such as by depressing the appropriate key(s) on his touch tone phone, or when an AUTODIAL FAX TONE is heard, control box 25 generates a coded signal unique to one of LABs 29B-29H. LABs 29B-29H receive this coded signal, and the appropriate one generates a local ring signal causing its corresponding telephone device to ring. When the telephone device goes off-hook, the LAB completes a normal connection between its corresponding telephone device and external line 12.

Figure 3B:
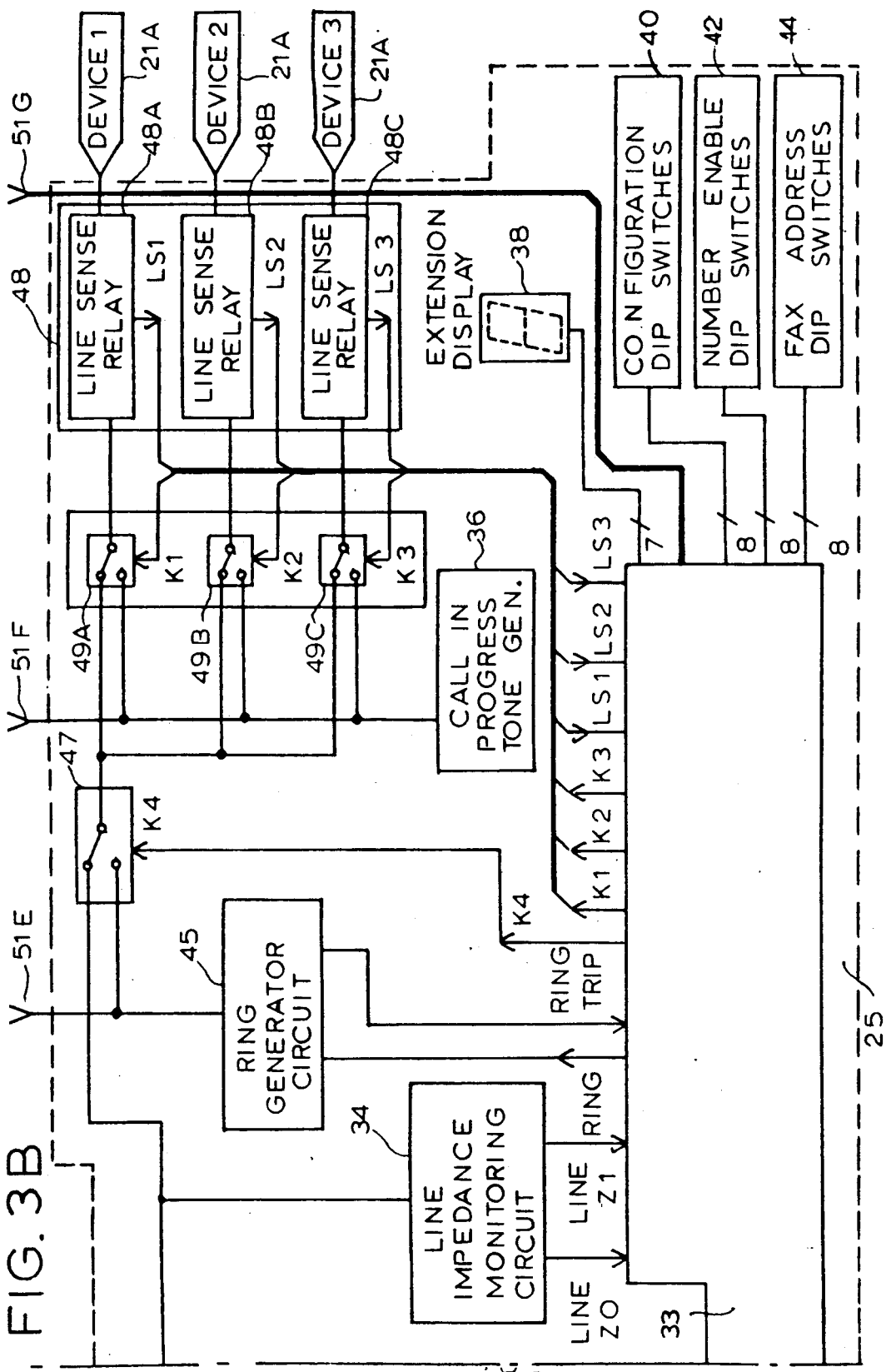

As shown in FIG. 3, control box 25 receives via cord 23A the telephone signal incoming on an external line. This incoming signal is input to polarity and surge protection circuit 30. This circuit is of a conventional, well known design, and simply passes the incoming signal through and protects the control box from reversed polarity wiring and incoming voltage surges. The incoming signal is then input to Central Office (hereinafter "CO") ring detector circuit 31. This circuit is also of a conventional, well known design, and simply generates a trigger signal CO_RING to CPU 33 when a ring signal from the CO is detected. In response to the receipt of this CO_RING trigger signal, CPU unit 33 closes the normally open hook switch 35. (The term "hook switch" is used because its status determines whether control box 25 appears to be on or off hook.) Consequently, signals can be transmitted across it from cord 23A to audio interface circuit 32 via jumper wire 52 (its purpose is explained below in detail). This circuit 32 is also of a conventional, well known design, and simply passes the audio signal received from cord 23A to DTMF detect circuit 43, dialtone detect circuit 50 and autodial fax detect circuit 37. It also passes the audio signal from message record/playback circuit 41 and the RINGBACK signal from audible ringback circuit 39 to cord 23A. With the closure of switch 35, control box 25 has effectively answered the incoming phone call to represent a OFF HOOK state. If, at any time during the call, the caller hangs up, dialtone detect circuit 50 will signal CPU 33 (via the DIALTONE signal) to terminate the call. Upon receipt of the DIALTONE signal, CPU 33 will open switch 35 thereby returning control box 25 to its normally open condition representing an ON HOOK state.

With the closure of switch 35, fax detect circuit 37 can now receive a signal arriving at the site via external line 12. This circuit is also of a conventional, well known design, and simply detects the presence of a standard AUTODIAL FAX tone signal. If fax detect circuit 37 senses a standard AUTODIAL FAX tone signal, it generates a fax operation signal AFAX to CPU 33. Should CPU 33 receive such a fax operation signal AFAX, CPU 33 will read fax address dip switches 44 to determine what extension number the fax machine is connected to and will cause audible ringback circuit 39 to operate in a manner as described in detail below in connection with FIG. 4 to cause the fax extension to ring.

Also with the closure of switch 35, DTMF detect circuit 43 can now receive a signal arriving at the site via an external line. This circuit is also of a conventional, well known design, and simply detects the presence of a standard DTMF tone signal. If DTMF detect circuit 43 senses a standard DTMF tone signal, it generates a four bit DTMF data signal and a DTMF_VALID signal to CPU 33. Should CPU 33 receive such a DTMF_VALID signal, CPU 33 will read number enable dip switches 42 to determine if the number corresponding to the DTMF data signal is allowed and, if it is, will cause audible ringback circuit 39 to operate in a manner as described in detail below to cause the desired extension to ring.

If CPU 33 does not receive from the external line 12 an "identification" signal informing it of the particular extension to which access is sought, such as a fax operation signal or DTMF_VALID signal, as mentioned above, within two seconds of the closure of switch 35, CPU 33 actuates audio record and playback circuit 41. As a result, a prerecorded message is played back and transmitted, through the audio interface circuit 32, across the now closed switch 35 to external line 12 so that it can be heard by the calling party. This message can, for example, inform the calling party that any one of several telephone devices can be selected by depressing a particular number on his touch tone key pad. For example, the message can say, "Please touch 4 for fax, 5 for computer, 6 for Mr. X, 7 for Ms. Y, and 8 for answering machine." If the calling party responds by touching one of the designated numbers, the resulting "identification" signal is transmitted on external line 12 through switch 35, and it is sensed by DTMF detect circuit 43, as described above, to generate the appropriate four bit DTMF data signal.

As a result of receiving a valid AFAX or DTMF data signal, CPU 33 is now provided with the information it requires to display an extension number on seven segment LED 38 to indicate which extension the caller has requested, thereby implementing one aspect of this invention. Specifically, by viewing LED 38 the called party can determine, without answering the call, what extension the caller has requested. Therefore, routing of the call is handled in accordance with the present invention without any intervention being required of the called party.

CPU 33 can now switch the call to the desired telephone device. This is done by signalling the desired telephone device to ring by producing a special audible signal (known as "ringback") with audible ringback circuit 39. The purpose of a standard ringback signal is to inform the calling party that the number he dialed, or the extension he requested, is ringing. Providing such a standard ringback signal while an extension is ringing is conventional as is done in all PBX type systems, for example. However, the present invention generates a special ringback signal, also called hereinbelow a "selection" signal, produced by circuit 39 as explained below.

Audible ringback circuit 39 encodes the conventional ringback signal with a signal that is used to address one, or several, of telephone devices 21B-21H. This can be done in one of three methods as follows.

The first signalling method employs amplitude modulation (AM) of the audible ringback signal which is normally a 440/480Hz signal with a cadence of 1 second ON and 3 seconds OFF. AM is a conventional, well known, method of transmitting information. This modulation is performed by switching the 440/480Hz tones off for short bit time durations, such as 20 msec, during the 1 second ON period, as shown in FIG. 7. FIG. 7 shows the AUDIBLE_RING control signal provided by CPU 33 to audible ringback circuit 39. The 180 msec and 20 msec signals are sensed by circuit 78 in the LABs, as discussed below, as a synchronization signal relative to the remaining 20 msec bit time duration. Each of the 20 msec bit times shown in FIG. 7 corresponds to one of the LAB addresses. For instance, if it is desired to ring all LABs with addresses of 3, the signal would appear as shown in FIG. 7A.

Figure 8A:
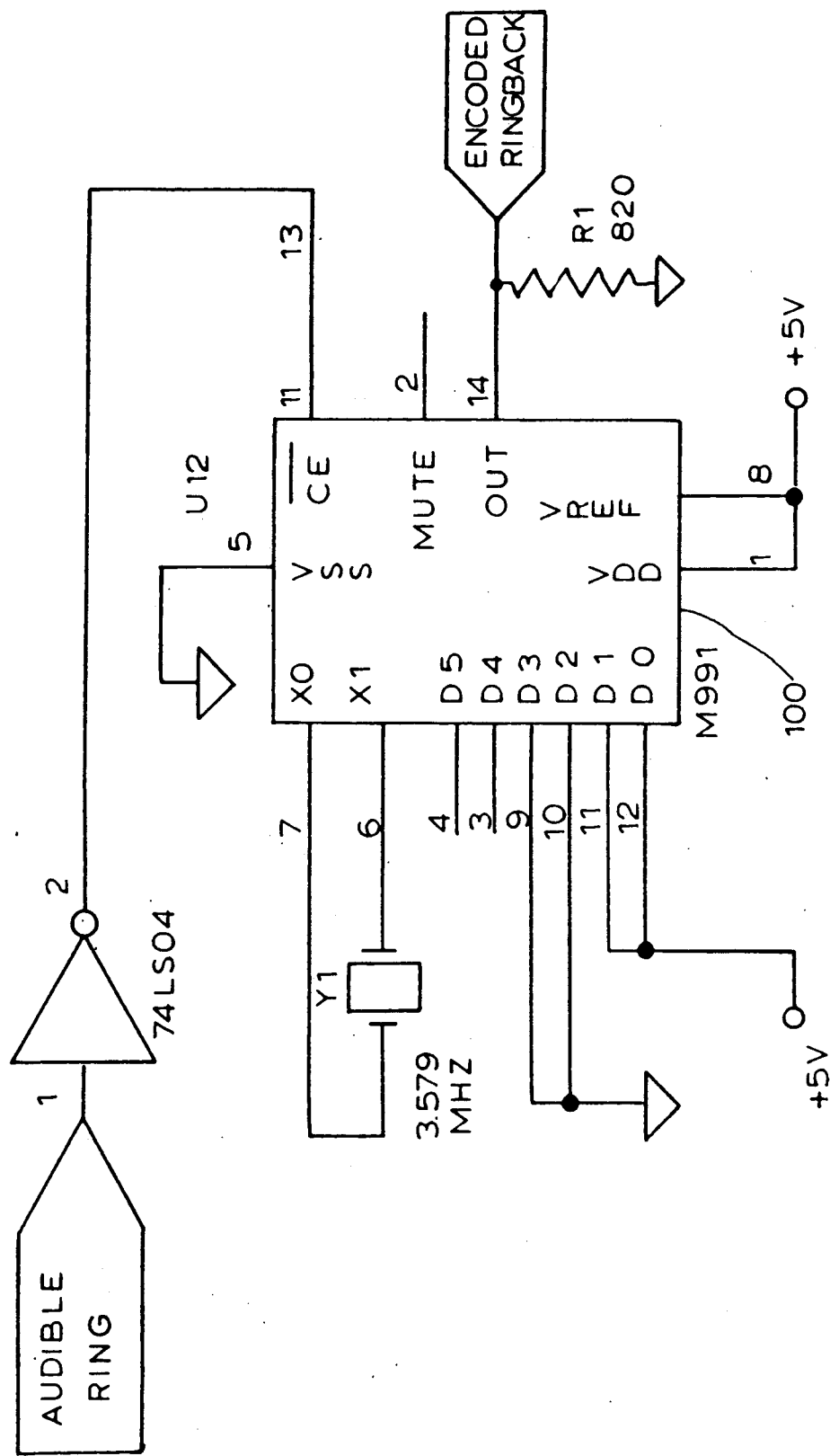
FIG. 8A is a schematic block diagram showing details of an audible ringback circuit used for AM signalling.

Amplitude modulation of the audible ringback can be performed with the audible ringback circuit 39 shown in FIG. 8A. FIG. 8A shows device 100 which is an integrated circuit chip available as M9991 from Teltone Corp. of Kirkland, Wash., and it is known as a "call progress tone generator". The circuitry shown in FIG. 8A is a conventional configuration for this chip. This circuit simply generates an audible ringback signal, or tone, whenever CPU 33 generates the AUDIBLE_RING signal of FIG. 3. Thus, during the 1 second ON period, CPU 33 will turn the AUDIBLE_RING signal on and off, as required per the timing diagram shown in FIG. 7, to encode the desired information onto the audible ringback tone.

A second method to encode the audible ringback signal involves frequency shift keying (FSK) of the standard audible ringback signal. FSK signalling is a conventional, well known, method of transmitting information. The same timing described by FIG. 7 will be used, except instead of turning the 440/480Hz tones ON and OFF, the 480Hz component of the ringback signal will be the lower frequency of an FSK signal having 500 Hz as its higher frequency component.

Figure 8B:
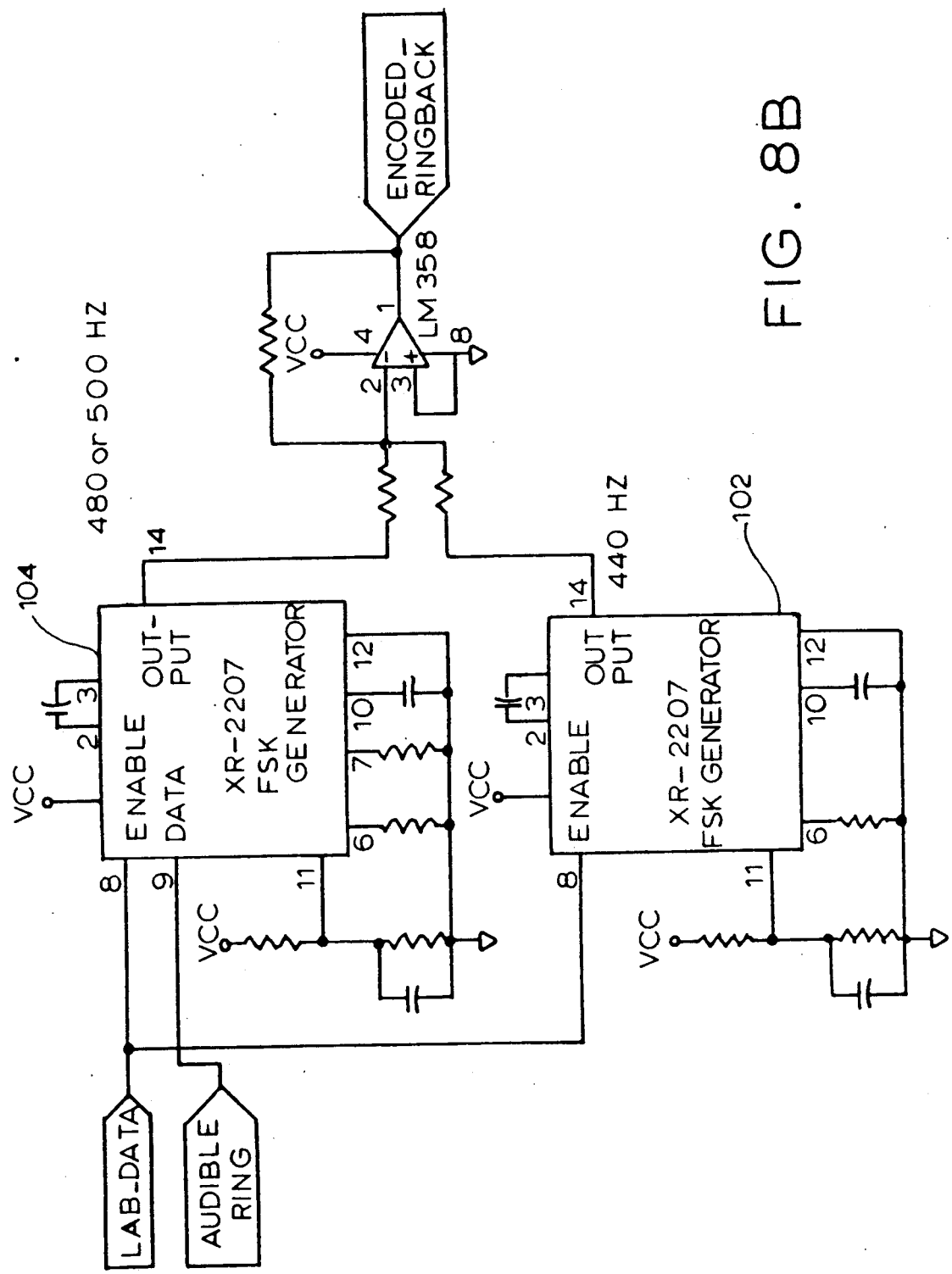
FIG. 8B is a schematic block diagram showing details of an audible ringback circuit for FSK signalling.

FSK signaling can be accomplished with the audible ringback circuit 39 shown in FIG. 8B. This circuit utilizes two FSK generator chips available as XR-2207 from EXAR Corp. of Sunnyvale, Calif. FIG. 8B shows both chips configured in a conventional manner, with chip 102 being used to generate the 440Hz tone, while chip 104 is controlled to selectively generate the 480Hz or 500Hz tones. In order to function properly, chip 104 requires an enable signal which activates it, i.e. puts it in an ON state, or deactivates it into an OFF state. The ON/OFF state is determined by a LAB_DATA signal provided by CPU 33. A broken line depicts the LAB_DATA signal being output by CPU 33 because it is used only for FSK type of signalling. When the ON state is set by the LAB_DATA signal, the AUDIBLE_RING signal of FIG. 7 is used to select either the 480Hz or the 500Hz tone. Thus, the circuit of FIG. 8B generates an audible ringback tone whenever CPU 33 generates the LAB_DATA signal of FIG. 3. However, instead of consisting of 440/480Hz tones, the ENCODED_RINGBACK signal will be either 440/480Hz or 440/500Hz as determined by the AUDIBLE_RING signal controlled by CPU 33. Thus, while CPU 33 turns the LAB_DATA signal ON for 1 second, the AUDIBLE_RING signal is turned ON and OFF, as required per the timing diagram shown in FIG. 7, to encode the desired information onto the audible ringback tone.

As mentioned above, the resulting ENCODED_RINGBACK signal is transmitted via switch 35 to all of the telephone devices 21B-21H through wiring 20. Thus, each of LABS 29B-29H receives this signal for further processing, as discussed below with respect to the description of FIG. 5.

Figure 9:
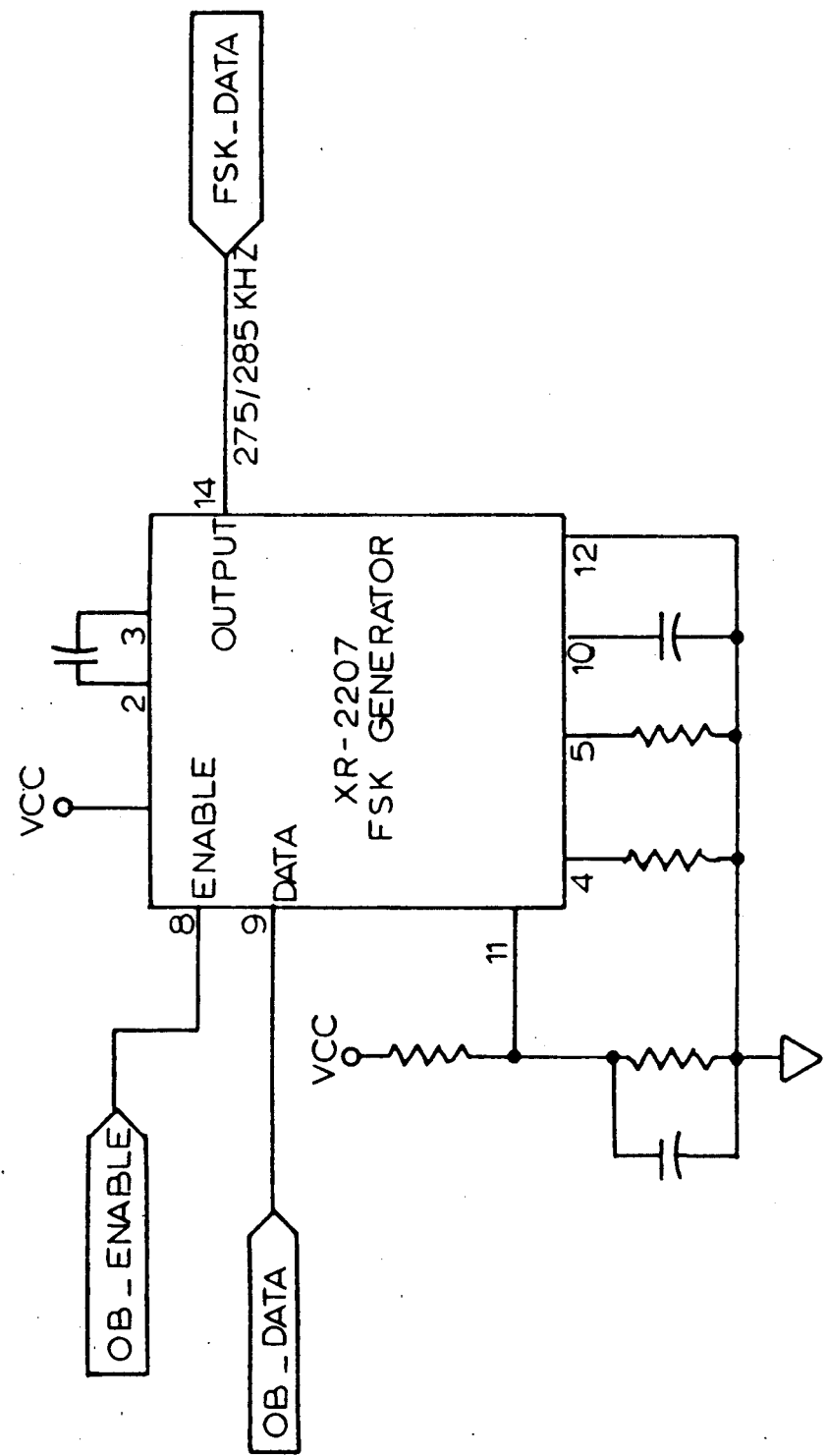
FIG. 9 is a schematic block diagram showing details of an out-of-band signalling circuit for out-of-band signalling.

Preferably, the coded portion of the ENCODED_RINGBACK signal is not audible to the caller (i.e. other than the expected ring, of course). Otherwise, it may be apparent to the caller that the special switching functions being performed are those of a low-end ATA more common perhaps to a small business and, therefore, the image that is sought to be created in the caller's mind of a sizeable operation may be diminished. Also, if the coded portion of the EN-CODED_RINGBACK signal were to be audible to the caller, it may cause discomfort, inconvenience, and/or irritability. However, the two encoding schemes described above will produce a coded portion that is audible to the caller. Therefore, a third method of transmitting information to the LABs can be implemented. Unlike the first two methods (AM and FSK) which will perform the signalling within the voice band (300Hz to 3000Hz) of the telephone network, this technique implements "out of band" signalling. In particular the signal levels in the frequency band from 270 kHz to 6 MHz may be as high as −15dBV (per part 47 of the Code of Federal Regulations concerning Telecommunication, paragraph 68.308,e.1.ii), thus allowing for adequate signal levels to perform out of band signaling. Out of band signaling can be implemented using out of band FSK circuit 46 shown in FIG. 3. Broken lines are used to depict the connections of circuit 46 to the remaining circuitry to indicate that its use depends on whether this type of signalling is selected. This encoding technique is similar to in-band FSK signaling, but with carrier frequencies of 275 and 285 kHz, as shown in FIG. 9. In this case the audible ringback signal generated by the audible ringback circuit of FIG. 3 contains no information and is used only for its original purpose, namely to indicate to the caller that an extension is ringing. Only one XR-2207 chip is required because the 440Hz tone is generated by an audible ringback circuit 39. The OB_ENABLE signal from CPU 33 is analogous to the LAB_DATA signal of FIG. 8B in terms of setting the ON/OFF state of the chip. The OB_DATA signal from CPU 33 is analogous to the AUDIBLE_RING signal of FIG. 8B in terms of implementing the encoding by selecting the output frequency to be either 275kHz or 285 kHz, as per the timing diagram of FIG. 7.

Although control box 25 has been described above as being used for switching the incoming call to the telephone device 21B-21H desired by the caller, it can also switch the incoming call to telephone device 21A connected directly to itself. Telephone device 21A shown in FIG. 2 can be a single device, or it can be representative of several devices, such as devices 1, 2, 3 shown in FIG. 3. A switching unit 49 is provided having device selection switches 49a, 49b, 49c connected, respectively to the inputs of devices 1, 2, 3 of device 21A. The normal position of the movable contact of these device selection switches is shown by broken lines in FIG. 3. If the telephone device selected by the calling party is connected directly to control box 25, CPU 33 actuates one of device selection switches 49A, 49B, 49C of switch unit 49 with signals K1-K3, respectively. The term "actuate" as used herein describes controlled movement of a switch contact to the solid line position. Movement back to the broken line position is described herein as the "return" of the switch contact. CPU 33 also triggers local ring generator circuit 45, via the RING signal, which sends a normal telephone ring signal to telephone device 21A via switch 47 having its movable contact in the normal position depicted by a broken line in FIG. 3 and via the appropriate device selection switch of unit 49.

The normal ring from external line 12 which was detected by normal ring detector 31 was blocked from reaching telephone device(s) 21A by the normal-ring-blocking switch 47 having its contact in the normal position. When, after local normal-ring-generator circuit 45 generates its rings, CPU 33 senses telephone device 21A going OFF HOOK via the LS1-LS3 signals from line sense relay unit 48, and CPU 33 then generates signal K4 which actuates switch 47 to move its contact to the solid line position in order to connect telephone device 21A through to external line 12. Line sense relay unit 48 is conventional and well known, so that no further details concerning it are deemed necessary.

Upon completion of a call, telephone device 21A going back ON HOOK will trigger CPU 33 via signals LS1-LS3 generated by line sense relay unit 48 that telephone device 21A has been hung-up. CPU 33 will then actuate device select switch unit 49 and ring switch 47 to resume their respective normal positions.

If telephone device 21A consists of a plurality of such devices, each can be accessed by actuation of a suitable one of - device selection switches 49a, 49b, 49c by a control signal (K1-K3) generated by CPU 33. In this respect, it will be noted that the combination of switches 49a, 49b, 49c coupling the external line 12 to one of the telephone devices 21A under control of CPU 33 is similar to the prior art approach depicted in FIG. 1.

If telephone device 21A is taken OFF HOOK to place an outgoing call (i.e. not in response to a ring triggered by an incoming call) CPU 33 will, via signals LS1-LS3 from line sense relay unit 48 sense which device is requesting the external line. After determining that a call is not in progress by checking for all devices being ON HOOK, as described below, CPU 33 actuates switch 47 and switch unit 49 thereby connecting telephone device 21A through to external line 12. By making sure the external line is not in use before actuating these switches, the exclusionary feature of this invention is attained.

If telephone device 21A is taken OFF HOOK to place an outgoing call and CPU 33 determines, as described below, that a call is in progress, switch unit 49 will not be actuated with signals K1-K3 from CPU 33 so that the movable contacts remain in their normal position, thereby allowing call-in-progress tone generator circuit 36 to pass its audible tone to telephone device 21A so that the caller can be notified of this condition. Call-in-progress tone generator circuit 36 is continuously generating its tone, so that this tone is available and audible whenever device 21A is taken OFF HOOK, and as long as switch unit 49 is not actuated. If the switch hook of telephone device 21A is manually flashed, indicating that the exclusion is to be deliberately over-ridden, CPU 33 will sense the flash via signal LS1-LS3, and it will consequently toggle switch unit 49 to its other position, as explained below.

Figure 10:
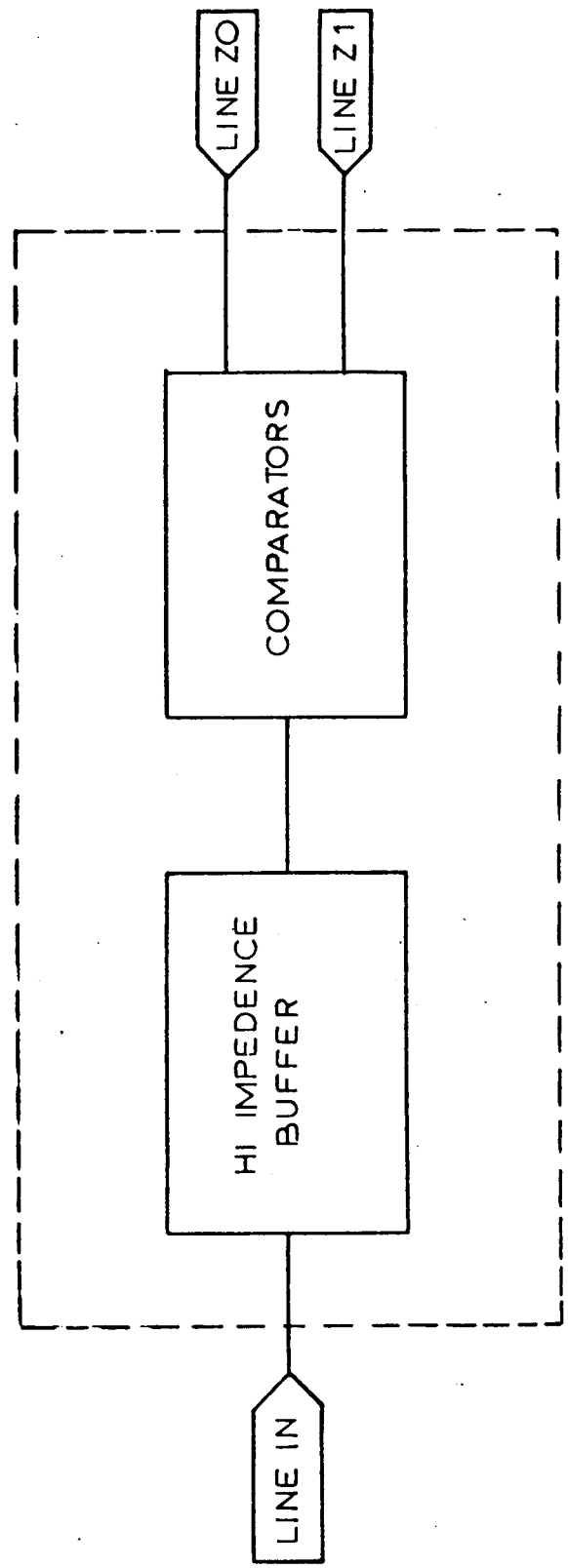
FIG. 10 is a schematic block diagram showing details of a line impedance monitoring circuit.
Figure 11A:
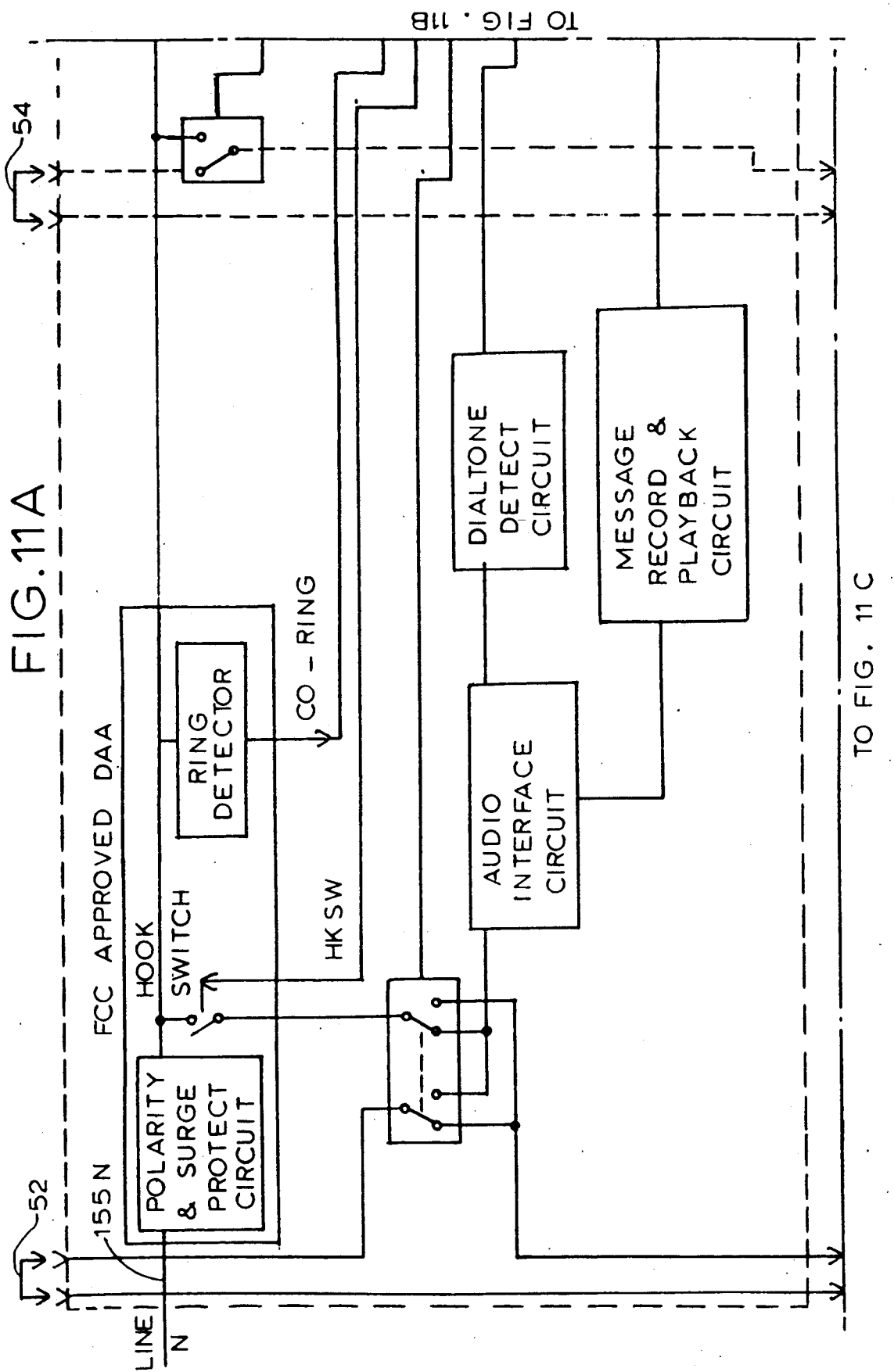
FIG. 11 is a schematic block diagram illustrating a multi-line implementation of the invention.
Figure 11B:
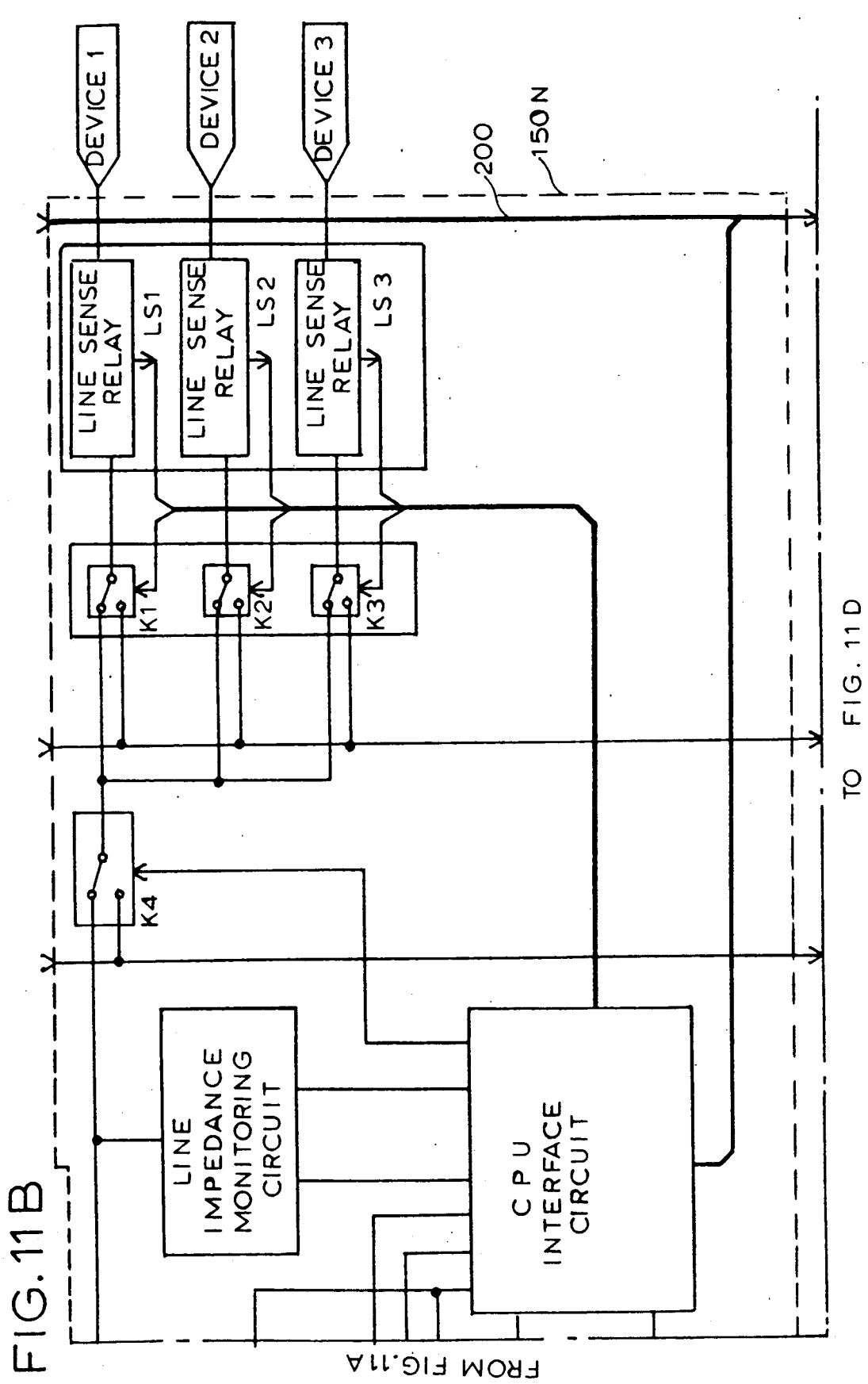
Figure 11D:
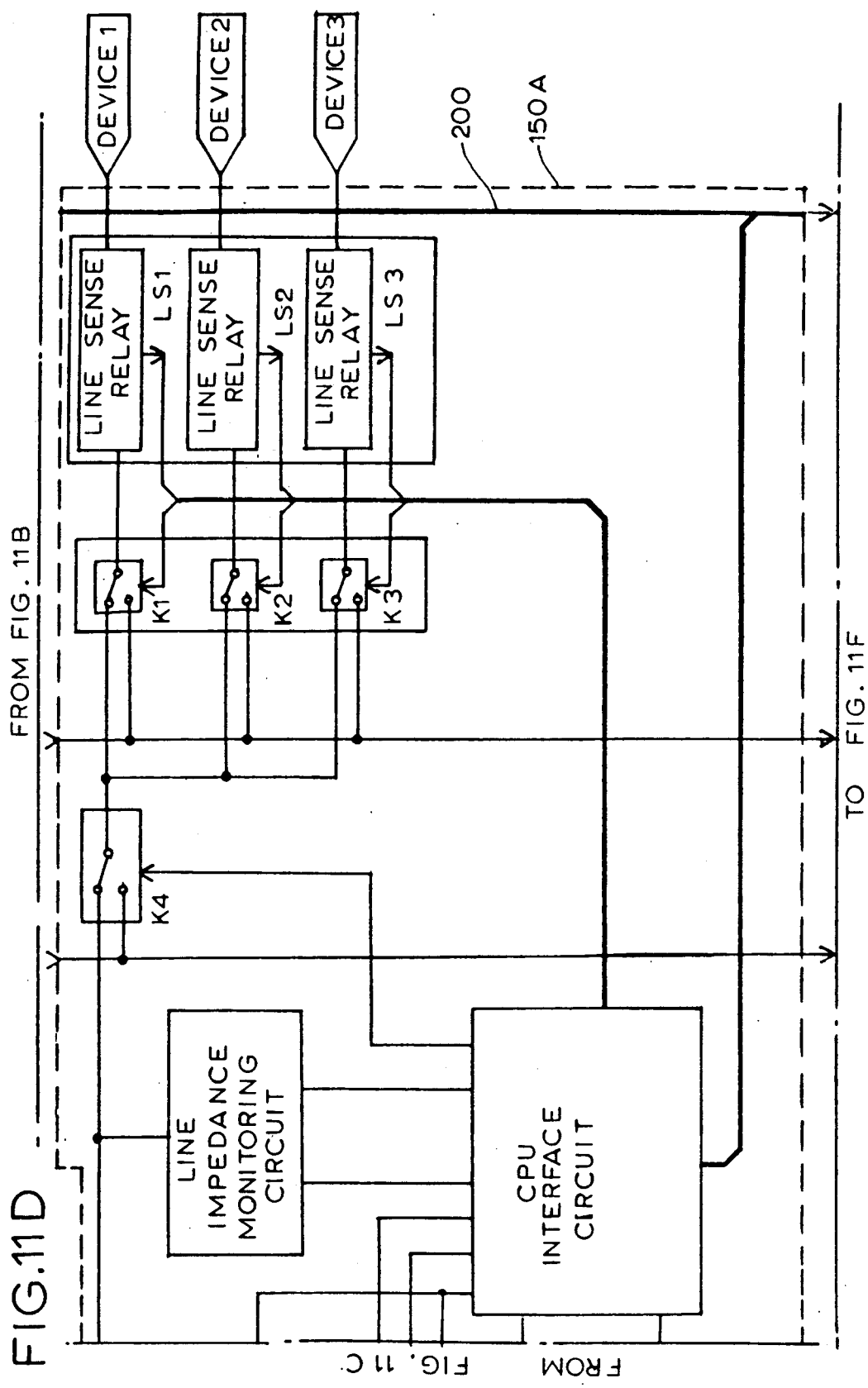
Figure 11E:
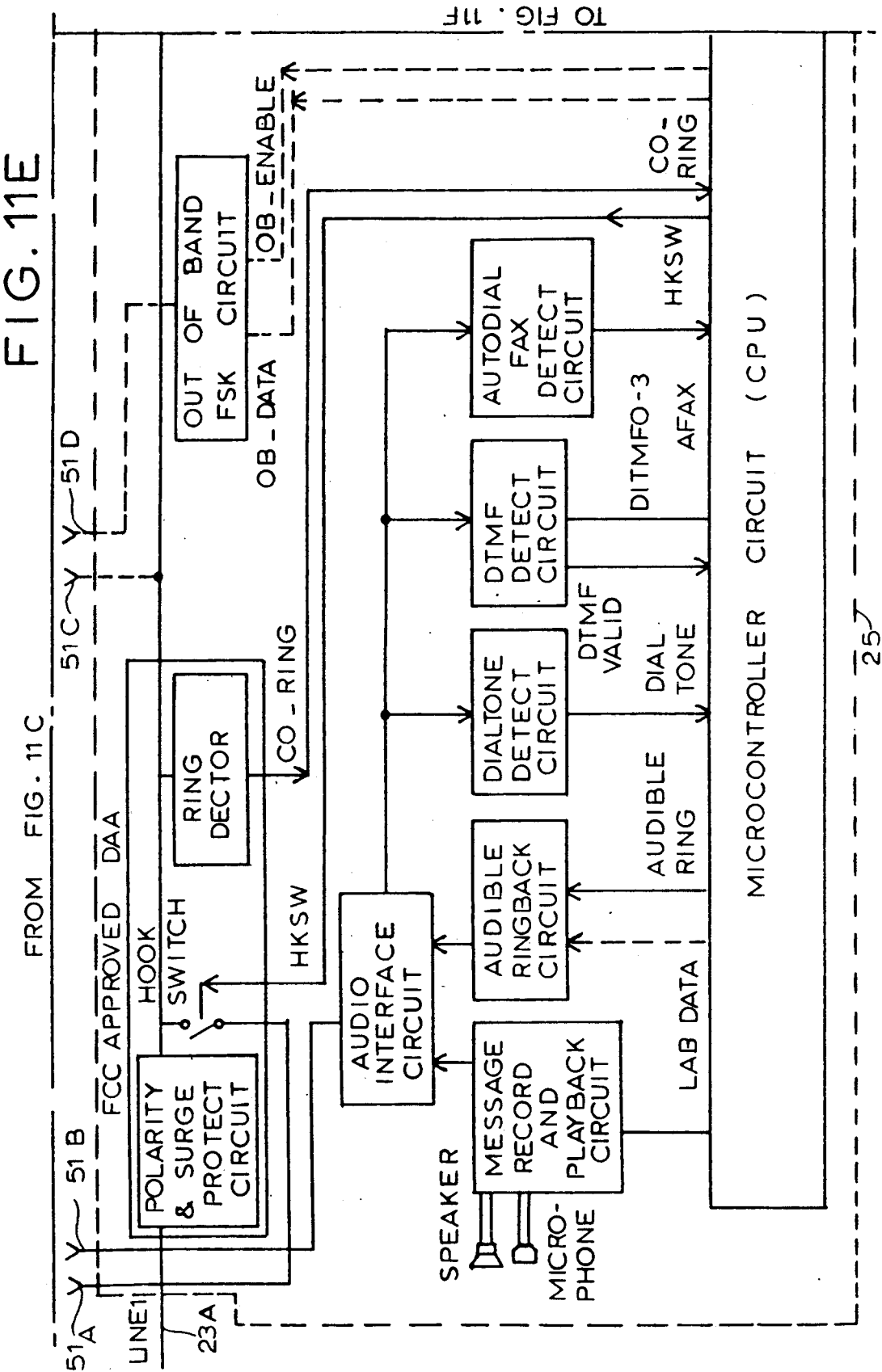

CPU 33 can check on whether the devices are ON HOOK by determining the status of line 20 via the LINEZ0 and LINEZ1 signals generated by line impedance monitor circuit 34. FIG. 10 depicts line impedance monitor circuit 34 which is simply a high input impedance buffer followed by window comparators to detect three states of the external line as follows:

|  | LINEZ1 | LINEZ0 |
| --- | --- | --- |
| ALL DEVICES ON HOOK | 0 | 0 |
| ONE DEVICE OFF HOOK | 0 | 1 |
| MORE THEN 1 DEVICE OFF HOOK | 1 | 0 |

While control box 25 is in its normal state with no incoming call being processed, if any other extension goes OFF HOOK, line impedance monitor circuit 34 will alert CPU 33 via the LINEZ0 and LINEZ1 signals that a device is OFF HOOK, and CPU 33 will subsequently cause seven segment LED 38 to indicate that a call is in progress, as explained below.

Figure 12:
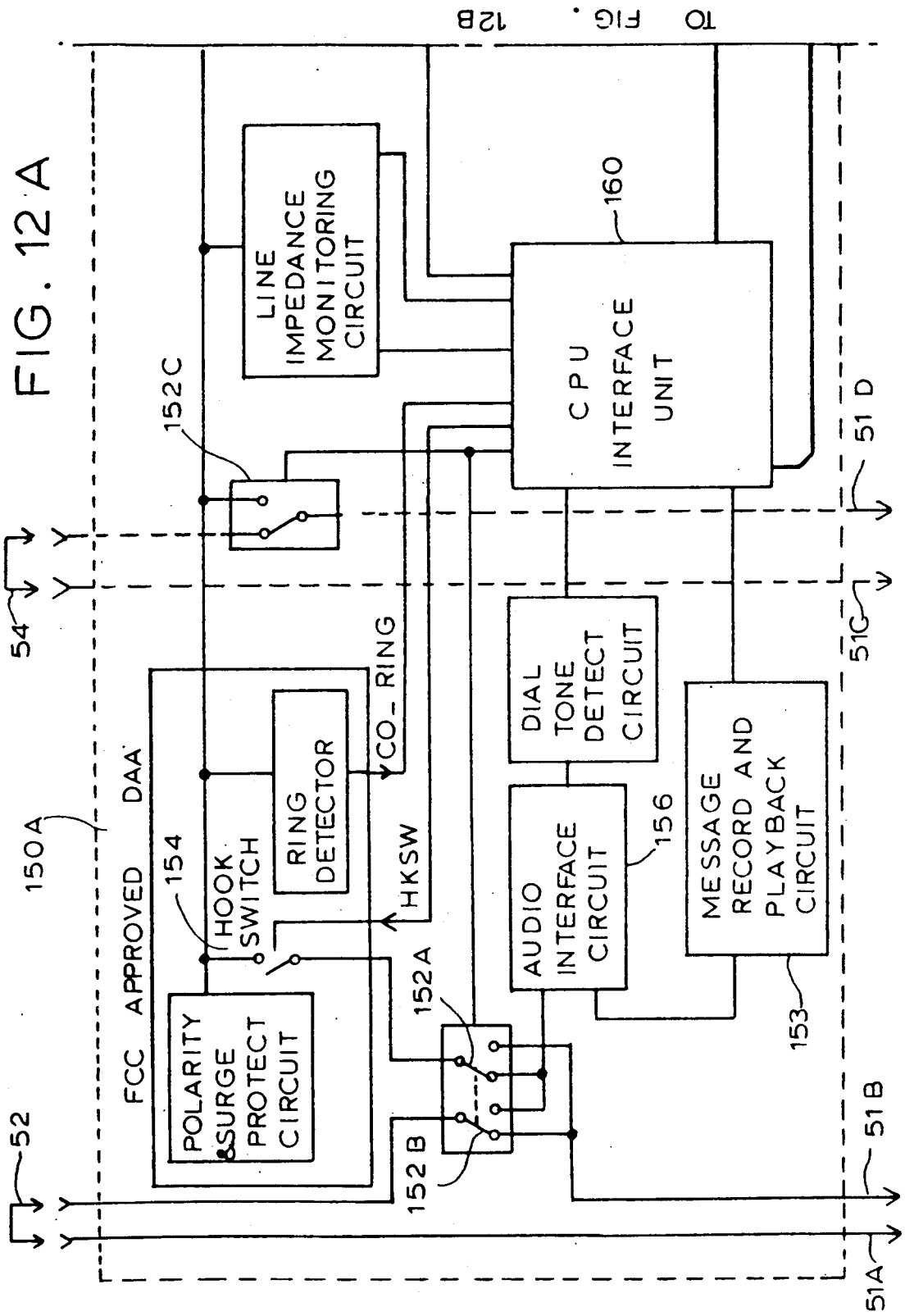
FIG. 12 is a schematic block diagram showing details of a multi-line expansion circuit.

Multi-line implementations of the present invention can be accomplished with the addition of one or more identical multi-line expansion circuits 150A-N shown in FIG. 11, details of which are shown in FIG. 12. Multi-line expansion circuit 150A is interconnected to control box 25 via expansion connectors 51A-G, as shown in FIG. 11. Additional multi-line expansion circuits, one for each additional line, would connect in series. Note that termination jumper wires 52 and 54 shown in FIG. 3 have been removed from control box 25 and are placed on the last multi-line expansion circuit, namely 150N. Thus, in a multi-line implementation, external line 12 remains connected to control box 25 just as shown in FIG. 3. Each additional line 155A-N has a corresponding respective expansion circuit 150A-N. Each external line remains isolated as it enters the site and is individually wired throughout the site with a dedicated wire 20. Thus, each external line is connected only to its own expansion circuit 150A-N. Connectors 51A and B are used for sharing the audio interface circuit 32 among expansion circuits 150A-N by completing the series connection mentioned above. Connectors 51C and D enable sharing of out-of-band FSK circuit 46 in the same way as just mentioned for circuit 32. Connector 51E connects ring generator circuit 45 to the ring switch in all the expansion circuits 150A-N. Similarly, connector 51F connects call-in-progress tone generator circuit 36 to the device selection switches in all of the expansion circuits. Finally, connectors 51G connect bus 200 from CPU 33 to the CPU interface circuit 160 in each expansion circuit. Bus 200 contains address and data lines. Circuit 160 decodes the signals on the address and data lines to determine whether the signals on the bus 200 are intended for the expansion circuit of which interface 160 is a part.

The following discussion of a two-line system using external lines 12 and 155A refers to FIGS. 11 and 12. As in a single line system, an incoming call on external line 155A will be detected by ring detector 151 which consequently generates a CO_RING signal that is routed to CPU 33 via CPU interface circuit 160. The CO_RING signal of each expansion circuit is different from any other CO_RING signal in the system so that the CPU can identify it individually. In response to receipt of the unique CO_signal from line 155A, CPU 33 will close normally open hook switch 154 with signal HKSW. (Signal HKSW for actuating hook switch 154 is different from signal HKSW for actuating hook switch 35 of control box 25 or the hook switch of any other expansion circuit because each hook switch must be individually accessible by CPU 33. For convenience and simplicity, however, the same label is used for all signals from CPU 33 to a hook switch.) If no call is in progress on line 12 (as explained below), CPU 33 actuates line control switches 152A-C to move their contacts to the broken line position. This action connects line 155A via now closed hook switch 154, line control switch 152A and expansion connector 51B to audio interface circuit 32 in control box 25. Likewise, out-of-band FSK switch 46 (if this type of signalling is used) is now connected to line 155A via connector 51D, and switch 152C. From this point on, operation is similar to the single line system previously described, except that ring switch 157, device select switch unit 158 and line sense switch unit 159 of expansion circuit 150A are used instead of the corresponding components of control box 25. Of course, it is readily apparent that in order for a particular telephone device to be accessible by more than one line, the telephone device itself must be connected to the individual, dedicated lines 20 for the multiple external lines which are necessary, as explained above.

With the actuation of line control switch 152B by CPU 33, audio interface circuit 156 is made available to external line 12 via actuated switch 152B, jumper wire 52, expansion connector 51A, hook switch 35 (after CPU 33 closes it when triggered by CO_RING signal from ring detector 31), and circuit 30. So now, if line 12 presents an incoming call while a call is being processed on line 155A, CPU 33 will connect audio interface circuit 156 to line 12. In the meantime switch 152B blocks any signal from passing between line 12 and audio interface circuit 32. Under control of CPU 33, audio interface circuit 156 passes a prerecorded audio message from message playback circuit 153 to actuated line control switch 152B, and subsequently to line 12. The message played to the caller on line 12 by message playback circuit 153 is, for example, "Please hold. All lines are busy now". After the call on line 155A is completed, line control switches 152A-C are returned to the solid line position of FIG. 12, thus re-establishing the connection from audio interface circuit 32 to now closed hook switch 35 via expansion connector 51A, jumper wire 52, switch 152B, and expansion connector 51B. Hence, an incoming call from line 12 will be processed as previously described for a single line system.

Operation of the system will now be described when it has no incoming call in progress. In the event of an incoming call on line 12, control box 25 will process the call as previously described for a single line system except that the signals between hook switch 35 and audio interface circuit 32 are routed via expansion connector 51A, jumper wire 52, switch 152B (with its contact being in the solid line position) and expansion connector 51B. Now, while the call is being processed by control box 25 from line 12, if line 155A also presents an incoming call, message playback circuit 153 will play the "Please hold..." message for the caller on line 155A via audio interface circuit 156, switch 152A, and hook switch 154. Once control box 25 has processed the call on line 12, CPU 33 will actuate line control switches 152A-C, and the actions previously described will occur.

Figure 4A:
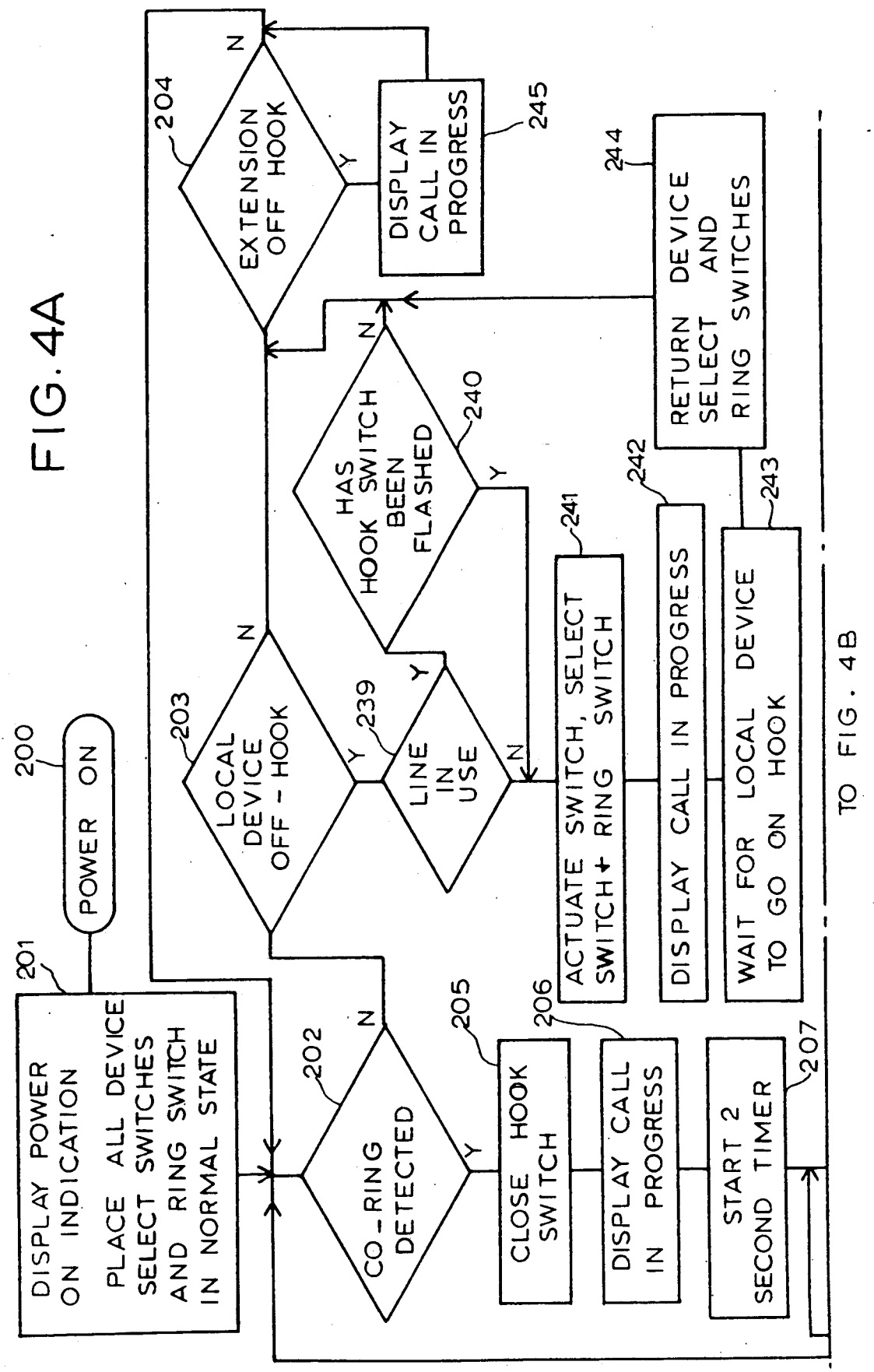
Figure 4B:
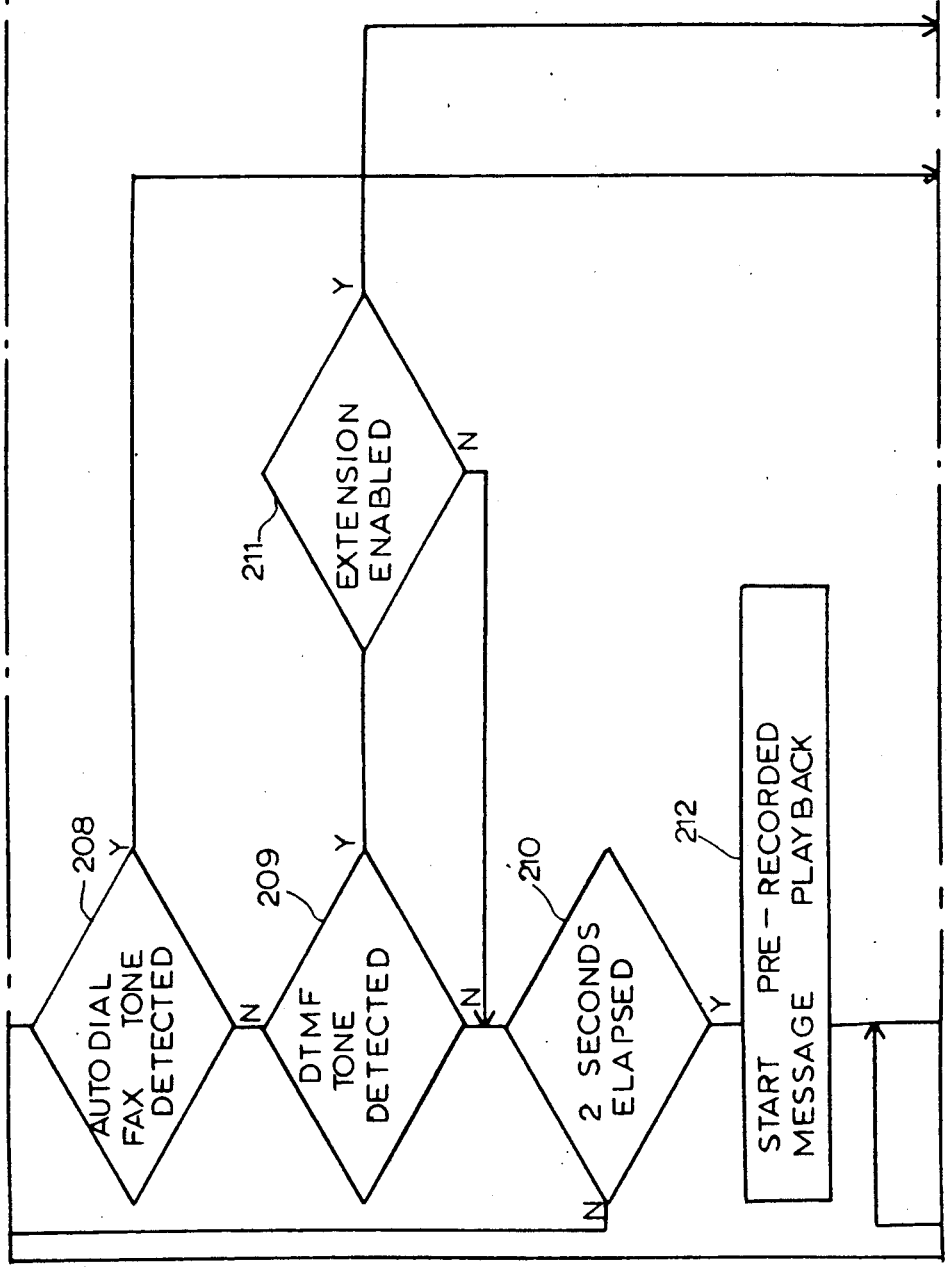

A flow chart for routines executed by CPU 33 to carry out the above-described operations is shown in FIG. 4.

Box 200 represents a power ON status. In accordance with power being ON, operational flow proceeds to box 201.

Action box 201 causes LED 38 (shown in FIG. 3) to display a power ON indication, all device select switches 49 are actuated to the broken line portion of FIG. 3 via signals K1, K2 and K3, and ring switch 47 is actuated to its broken line condition via signal K4. The operation then cycles to the main loop which includes decision boxes 202, 203 and 204.

Decision box 202 evaluates the CO_RING signal received from ring detector circuit 31. A positive response indicative of an incoming call causes operational flow to proceed to box 205. A negative response causes operational flow to proceed to box 203.

Decision box 203 determines based on inputs LS1, LS2, and LS3 from line sense relay unit 48 whether a device 21A is in an OFF HOOK condition. A negative response from box 203 causes flow to proceed to decision box 204. A positive response from box 203 causes flow to proceed to decision box 239.

Decision box 204 determines based on inputs LINEZ0 and LINEZ1 from line impedance monitoring circuit 34 whether an extension of devices 21B-21H is OFF HOOK. A positive response causes flow to proceed to box 245 which produces display of a symbol indicating that a call is in progress. A negative response from box 204 causes flow to loop back to box 202.

If an incoming call is ascertained by box 202, action box 205 provides output signal HKSW to hook switch 35 resulting in closure of the switch. Flow proceeds to box 206.

Action box 206 outputs a call-in-progress indication to LED display 38. Flow then proceeds to box 207.

Action box 207 starts a 2 second timing period. Flow then proceeds to decision box 208.

Decision box 208 checks for a valid AFAX signal from the autodial fax detect circuit 37. A positive response from decision box 208 causes operational flow to proceed to box 220. A negative response causes flow to proceed to decision box 209.

If no fax tone is detected, decision box 209 checks for a DTMF_VALID signal from DTMF detect circuit 43. A positive response causes flow to proceed to decision box 211. A negative response causes flow to proceed to decision box 210.

Decision box 210 checks whether the 2 second period, started per box 207, has expired. A negative response from box 210 causes operational flow to loop back up to decision box 208. A positive response from box 210 causes flow to proceed to box 212.

If a DTMF tone is detected, decision box 211 in conjunction with number enable DIP switches 42, determines if the DTMF signals from DTMF detect circuit 43 correspond to an enabled extension. A positive response from box 211 causes operational flow to proceed to box 223. A negative response from box 211 causes operational flow to proceed to box 210.

After the 2 second time interval has elapsed, action box 212 activates message record playback circuit 41, causing a prerecorded audio message to start playing. Operational flow then proceeds to decision box 213.

Decision box 213 checks for a valid AFAX signal from the autodial fax detect circuit 37. A negative response causes flow to proceed to decision box 214. A positive response causes flow to proceed to box 219.

Decision box 214 checks for a DTMF_VALID signal from DTMF detect circuit 43. A negative response from box 214 causes flow to proceed to box 215. A positive response from box 214 causes flow to proceed to box 221.

Decision box 215 evaluates inputs LINEZ0 and LINEZ1 from line impedance monitoring circuit 34. A positive response from box 215 indicating that an extension is OFF HOOK causes flow to proceed to box 233. A negative response, indicating no extensions OFF HOOK, causes flow to proceed to decision box 216.

Decision box 216 determines based on the DIALTONE signal from dialtone detect circuit 28 whether the calling party has hung up. A positive response from box 216 causes flow to proceed to box 238. A negative response causes flow to proceed to decision box 217.

Decision box 217 checks the message record playback circuit 41 to determine if the entire message has been played. A positive response causes flow to proceed to box 218. A negative response causes flow to loop back to box 213.

Action box 218 re-activates message record playback circuit 41, causing a pre-recorded audio message to start playing. Flow then loops back to box 213. This provides for message replay for as long as the caller does not hang up.

Action box 219 deactivates message record playback circuit 41, causing a pre-recorded audio message to stop playing, when the fax tone is detected. Operational flow then proceeds to box 220.

Action box 220, in conjunction with fax address DIP switches 44, determines which extension to activate. Operational flow then proceeds to box 223.

Decision box 221 in conjunction with number enable DIP switches 42, determines if the DTMF signals from DTMF detect circuit 43 correspond to an enabled extension. A positive response causes flow to proceed to box 222. A negative response causes flow to proceed to box 215.

Action box 222 deactivates message record playback circuit 41, causing the pre-recorded audio message to stop playing. Flow then proceeds to box 223.

Action box 223 causes LED 38 to indicate the selected extension number. Flow then proceeds to box 224.

Action box 224 generates the ENCODED_RINGBACK signal. For AM signalling, only the AUDIBLE_RING signal is output to audible ringback circuit 39. For FSK in-band signalling, the LAB_DATA and AUDIBLE_RING signals are provided to circuit 39. For FSK out-of-band and signalling, the OB DATA and OB ENABLE signals are input to out-of-band FSK circuit 46, while a standard signal is provided to circuit 39 to merely trigger generation of a conventional ringback tone. Flow then proceeds to decision box 225.

Decision box 225 determines whether the previously determined extension is connected directly to the control box 25 via device connectors 21A. A positive response causes flow to proceed to box 226. A negative response causes flow to proceed to box 228.

Action box 226 in conjunction with signals K1, K2, and K3 of CPU 33 provided to device select switches 49 causes the selected device switch to be toggled. Flow then proceeds to box 227.

Action box 227 provides the RING signal to ring generation circuit 45 which activates the ring generation circuit. Flow then proceeds to box 228.

Decision box 228 evaluates inputs LINEZ0 and LINEZ1 from line impedance monitoring circuit 34, and LS1, LS2 and LS3 from line sense relay unit 48. A positive response indicating an extension OFF HOOK condition, causes flow to proceed to box 234. A negative response causes flow to proceed to box 229.

Decision box 229 evaluates the DIALTONE signal from dialtone detect circuit 28. A negative response causes flow to loop back to box 228. A positive response, indicating that the calling party has terminated the call, causes flow to proceed to box 230.

Action box 230 causes the RING signal provided to ring generation circuit 45 to turn off the ring generator, causes the AUDIBLE_RING signal provided to audible ringback circuit 39 to turn off the audible ringback circuit, and causes the OB_ENABLE signal provided to out-of-band FSK circuit to turn off the out-of-band FSK circuit (if out-of-band FSK encoding is being used, of course). Flow then proceeds to box 231.

Action box 231 causes signals K1, K2, and K3 of CPU 33 to return device select switch unit 49 to its normal position as depicted by a broken line. Flow then proceeds to box 232.

Action box 232 causes output HKSW to be removed from hook switch 35, thereby causing the switch to return to its normal position. Flow then loops back to box 202.

Action box 233 deactivates message record/playback circuit 41, thereby causing the pre-recorded audio message to stop playing, when an extension goes OFF HOOK after playback of the pre-recorded message has been started. Flow then proceeds to box 235.

Action box 234 causes execution of the same operations described above for box 230. Flow then proceeds to box 235.

When box 215 senses that an extension for device 21B-21H goes OFF HOOK, action box 235 causes hook switch 35 to open while ring switch 47 is actuated by signal K4 to have its contact moved to the solid line position. Flow then proceeds to box 236.

Action box 236 waits for a Call Over indication via inputs LINEZ0 and LINEZ1 from line impedance monitoring circuit 34 (i.e. for signal indicating all extensions 21B-21H are ON HOOK), or DIALTONE from dialtone detect circuit 28 (indicating that caller has hung up), or LS1, LS2 and LS3 from line sense relay unit 48 (indicating that device 21A is ON HOOK). Flow then proceeds to box 237.

Action box 237 causes device select switches 49 to be returned via the K1, K2 and K3 signals to their normal position, and ring switch 47 to be returned via the K4 signal to its normal position. This resets control box 25 for the next incoming call. Flow then loops back to box 202.

Action box 238 causes signal HKSW to be removed from hook switch 35, causing the switch to open if the caller hangs up, as determined by box 216. Flow then loops back to box 202.

Decision box 239 determines, based on inputs LINEZ0 and LINEZ1 from line impedance monitoring circuit 34, whether the phone line is in use. A positive response causes flow to proceed to box 240. A negative response causes flow to proceed to box 241.

Decision box 240 determines based on inputs LS1, LS2 and LS3 from line sense relay unit 48 whether the switch-hook on a local device has been flashed. A negative response causes flow to proceed to box 204. A positive response causes flow to proceed to box 241.

Action box 241 causes signal K4 to move the contact of ring switch 47 to its solid line position, and signals K1, K2, or K3 to device select switch unit 49 likewise move the contact of the appropriate switch 49A, 49B or 49C to its solid line position. Flow then proceeds to box 242.

Action box 242 outputs a call-in-progress indication to LED display 38. Flow then proceeds to box 243.

Action box 243 waits for the local device to go ON HOOK, as determined via inputs LS1, LS2 and LS3 from line sense relay unit 48. Flow then proceeds to box 244.

Action box 244 executes the same operations described above for box 237. Flow then proceeds to box 204.

Action box 245 outputs a call-in-progress indication to LED display 38. Flow then loops back to box 202.

Figure 5:
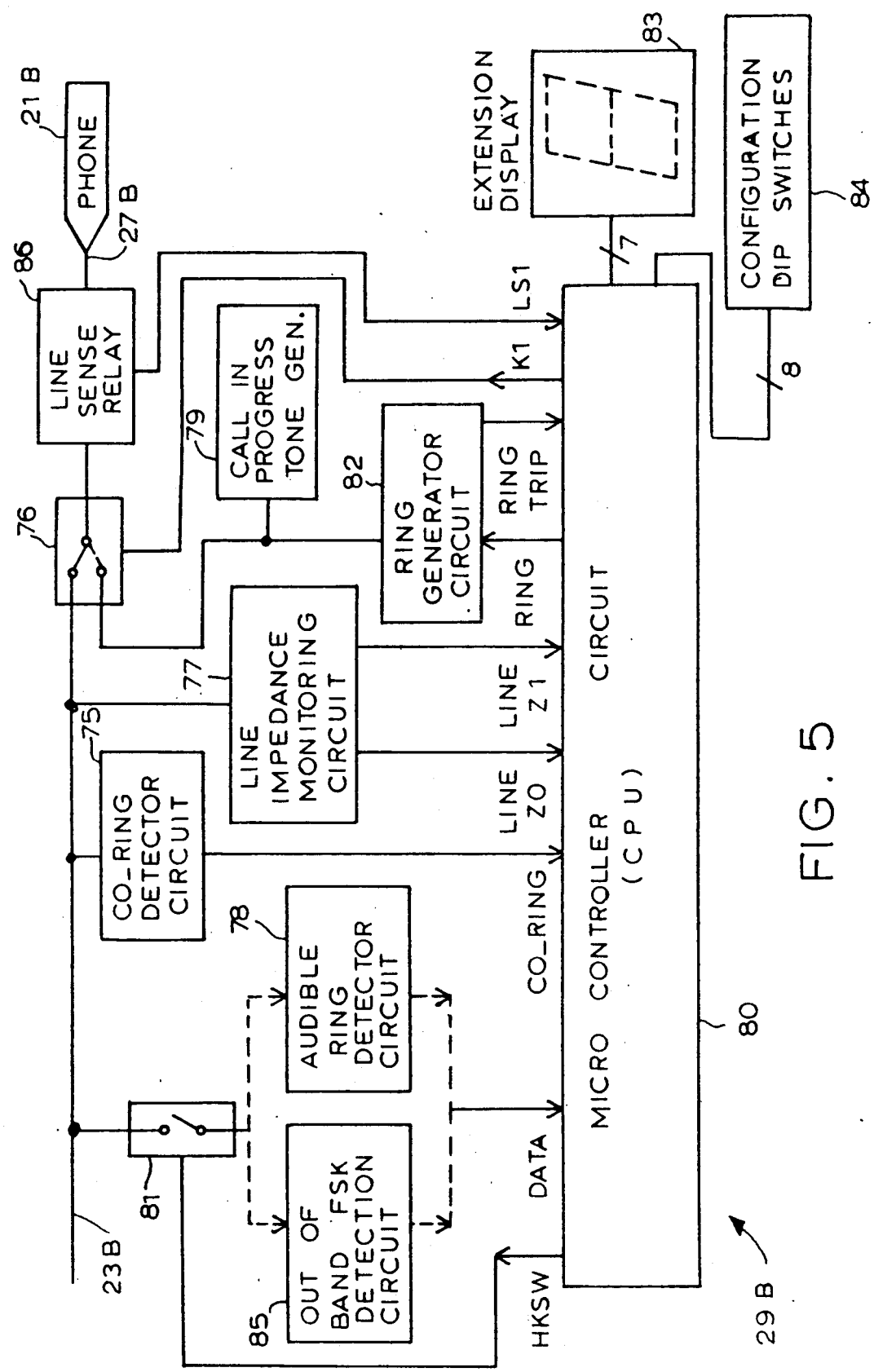
FIG. 5 is a schematic block diagram showing details of a LAB.

A more detailed explanation and description of the LAB as it is depicted in FIG. 5 will now be provided. Again, only the details of LAB 29B are provided. However, it should be understood that the ensuing discussion applies equally to LABs 29C-29H.

Lab 29B receives via cord 23B a signal from external line 12. A direct line 74 between cord 23B and telephone device 21B is kept open by ring switch 76 which has its movable contact in the normal position depicted by a broken line in FIG. 5. Consequently, the normal ring present on external line 12 will be blocked from reaching telephone device 21B. The incoming signal from external line 12 is also input to $CO_{13}$ RING detector circuit 75. As in control box 25, this circuit is of a conventional, well known design, and simply generates a trigger signal to CPU 80 when a CO_RING signal is detected. In response to the receipt of this trigger signal, CPU 80 waits for control box 25 to answer the incoming call as indicated by line impedance monitoring circuit 77 signalling that one device has gone off hook. In the event that a second CO_RING signal is received before control box 25 has gone OFF HOOK, CPU 80, presuming that the controller has failed, actuates ring switch 76 to move to its solid line position in order to allow telephone device 21B to connect directly to the external line. The second CO_RING signal, and all subsequent CO_RING signals, will, therefor, cause telephone device 21B to ring.

If CPU 80 finds that the incoming call has been answered (presumably by control box 25) it will close hook switch 81 via the HKSW signal to enable audible ring detector circuit 78 to listen for the encoded audible ringback signal, discussed above, generated by control box 25. The type of audible ring detector circuit 78 will depend upon which signalling method of the three disclosed above is used. In the case of an AM signal generated by control box 25, special ring detector 78 is preferably two active bandpass filters that pass only the 440Hz and 480Hz frequencies found in the encoded audible ringback signal. Other frequencies will be filtered out. These filtered signals are subsequently amplified, rectified and passed to level comparators to detect the presence or absence of both of the frequencies independently. The output of the comparators are then ANDed together and fed to CPU 80 for further processing, as explained above. In the case of FSK signaling generated by control box 25, special ring detector 78 is preferably an FSK demodulator circuit. This circuit is of a conventional, well known design, and simply passes a data stream directly to CPU 80 for further processing. In the case of out-of-band signalling generated by control box 25, special ring detector 78 is replaced with out-of-band FSK detector circuit 85 shown in FIG. 5. This circuit is an FSK demodulator circuit similar to that described above, except that it is tuned for carrier frequencies of 275 and 285kHz. This circuit will pass a data stream directly to CPU 80 for further processing.

Regardless of which transmission scheme is in use, CPU 80 receives a data stream to decode and extract the desired extension number from the signal generated by control box 25. Upon determining the extension number, CPU 80 displays the extension number on seven segment LED 83 thereby implementing one aspect of this invention. Specifically, the called party can determine what extension the caller has requested prior to answering the call. CPU 80 then checks configuration dip switches 84 set for LAB 29B to indicate what extension numbers will make LAB 29B ring, and compares them to the requested extension. If a match is found, the LI-RING signal generated by CPU 80 will trigger normal ring generator 82 to produce a normal ring signal for telephone device 21B. Consequently, telephone device 21B will ring. Telephone device 21B going OFF HOOK to answer the call will be detected via ring generator 82 which will immediately stop the RING signal, and will signal CPU 80 via the RINGTRIP signal that telephone device 21B has gone OFF HOOK. CPU 80 will then actuate ring switch 76 to its solid line position thereby completing the connection from telephone device 21B to external line 12. At the completion of the call, telephone device 21B going back ON HOOK will be detected by CPU 80 via signal LS1 from line sense relay 86, and hence CPU 80 will actuate ring switch 76 to return to its normal state.

If telephone device 21B is taken OFF HOOK to place an outgoing call (i.e. not in response to a ring signal), CPU 80 will sense, via the LS1 signal, that telephone device 21B is requesting the external line. After determining that a call is not in progress by checking for all devices being ON HOOK, as described below, CPU 80 will actuate ring switch 76 to move to its solid line position thereby connecting telephone device 21B through to external line 12. By making sure the external line is not in use before actuating ring switch 76, the exclusionary feature of this invention is attained. CPU 80 can determine the status of the external line in the same manner CPU 33 does, as previously described.

If telephone device 21B is taken OFF HOOK to place an outgoing call, and CPU 80 determines that a call is in progress, as previously described, ring switch 76 will be retained in its broken line position thereby allowing call in progress tone generator 79 to pass its signal to telephone device 21B. Call-in-progress tone generator 79, like circuit 36 of control box 25, produces a unique audio signal to telephone device 21B that informs the user that the line is in use. If the switch hook of telephone device 21B is manually flashed, indicating that the exclusion is to be deliberately over-ridden, CPU 80 will sense the flash via signal LS1 and subsequently toggle ring switch 76.

While LAB 29B is in its normal, inactive state, if any other extension goes OFF HOOK, line impedance monitor 77 will alert CPU 80 via the LINEZ0 and LINEZ1 signals that a device is OFF HOOK, and CPU 80 will subsequently cause seven segment LED device 83 to indicate that a call is in progress.

Figure 6B:
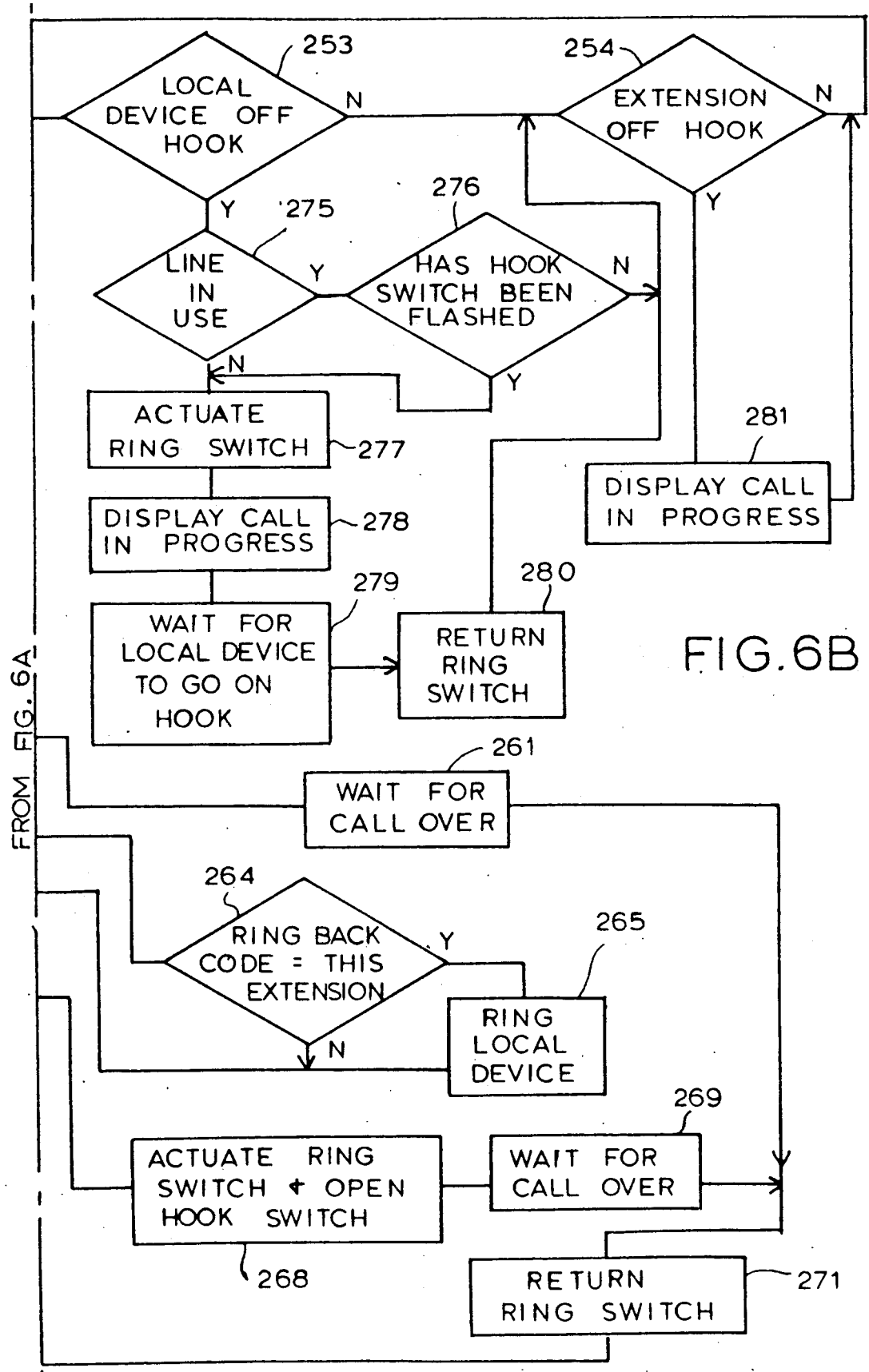
FIG. 6 is a flow chart describing the operation of the LAB.

A flow chart of the routines executed by CPU 80 in carrying out the above-described operations is shown in FIG. 6.

Box 250 represents a power ON status. In accordance with the initial power being ON, operational flow proceeds to box 251.

Action box 251 causes LED 83 to display a power ON indication, and ring switch 76 is closed via signal K1. The operation then proceeds into the main loop including decision boxes 252, 253 and 254.

Decision box 252 evaluates the input CO_RING from CO ring detector circuit 75. A negative response causes flow to proceed to box 253. A positive response causes flow to proceed to box 255.

Decision box 253 determines based on signal LS1 from line sense relay 86 (which is the same as line sense relay unit 48) and RINGTRIP from ring generator circuit 82 whether the local device 21B is OFF HOOK. A negative response causes flow to proceed to box 254. A positive response causes flow to proceed to box 275.

Decision box 254 determines based on signals LINEZ0 and LINEZ1 from line impedance monitoring circuit 77 whether an extension is OFF HOOK. A negative response causes flow to loop back to box 252. A positive response causes flow to proceed to box 281.

Decision box 255 in conjunction with signals LINEZ0 and LINEZ1 from line impedance monitoring circuit 77 and CO_RING from CO ring detector circuit 75, determines whether the control box answers the call before the second CO_RING signal. A negative response causes flow to proceed to box 257. A positive response causes flow to proceed to box 256.

If control box 25 answers the incoming call on the first ring, action box 256 causes the hook switch 81 to close via output signal HKSW. Flow proceeds to box 262.

If, on the other hand, control box 25 malfunctions and does not answer on the first ring, action box 257 causes the ring switch 76 via output signal K1 to move to its solid line position. The ringing of the incoming call is thus connected directly to the device at this (and at every other) extension. Flow then proceeds to box 258.

Decision box 258 determines whether the calling party has terminated the call via input signal CO_RING from CO ring detector circuit 75. A positive response causes flow to proceed to box 253 which is discussed in detail below. A negative response causes flow to proceed to box 259.

Decision box 259 determines whether a local device, or a remote extension, has gone OFF HOOK. The determination is based on signals LINEZ0 and LINEZ1 from line impedance monitoring circuit 77, and signal LS1 from line sense relay 86. A negative response causes flow to loop back to box 258. A positive response causes flow to proceed to box 260.

Action box 260 causes the LED 83 to display a call-in-progress indication. Flow then proceeds to box 261.

Action box 261 waits for a Call Over status derived via input signal LS1 from line sense relay 86, and the LINEZ0 and LINEZ1 signals from line impedance monitoring circuit 77. Flow then proceeds to box 271.

Decision box 262 determines based on the DATA signal from audible ring detector circuit 78, or from the out-of-band FSK detection circuit 85, whichever is being used, whether encoded data has been detected. A negative response causes flow to proceed to box 266. A positive response causes flow to proceed to box 263.

Action box 263 causes the LED 83 to display the number of the extension per the encoded data detected previously. Flow then proceeds to box 264.

Decision box 264, via configuration DIP switches 84, determines whether the encoded data detected previously corresponds to the local device or a remote device. A negative response causes flow to proceed to box 266. A positive response causes flow to proceed to box 265.

Action box 265 activates ring generator circuit 82 via the RING signal. Flow then proceeds to box 266.

Decision box 266 determines based on the RINGTRIP signal from ring generator circuit 82 whether the local device has gone OFF HOOK. A negative response causes flow to proceed to box 272. A positive response causes flow to proceed to box 267.

Decision box 267, via configuration DIP switches 84, determines whether the encoded data detected previously corresponds to the local device. A negative response causes flow to proceed to box 270. A positive response causes flow to proceed to box 268.

Action box 268 causes signals HKSW provided to hook switch 81 to open the hook switch, and signal K1 provided to ring switch 76 to move the contact of the ring switch 76 to its solid line position. Flow then proceeds to box 269.

Action box 269 waits for a Call Over status derived via input signal LS1 from line sense relay 86, and signals LINEZ0 and LINEZ1 from line impedance monitoring circuit 77. Flow then proceeds to box 271.

Decision box 270 in conjunction with input signal LS1 from line sense relay 86 determines if the hook switch of local device 21B has been flashed. A positive response causes flow to proceed to box 268 which enables the user to gain access to the call in progress. A negative response causes flow to proceed to box 272.

Action box 271 causes the signal K1 to return the contact of ring switch 76 to its broken line position thereby resetting the LAB to be ready for the next call. Flow then loops back to box 252.

Decision box 272 determines based on signals LINEZ0 and LINEZ1 from line impedance monitoring circuit 77 whether an extension is OFF HOOK. A positive response causes flow to proceed to box 274. A negative response causes flow to proceed to box 273.

Decision box 273 determines based on signals LINEZ0 and LINEZ1 from line impedance monitoring circuit 77 whether the calling party has terminated the call. A negative response causes flow to loop back to box 253. A positive response causes flow to proceed to box 274.

Action box 274 causes the hook switch 81 to open via output signal HKSW. Flow then loops back to box 252.

Decision box 275 determines based on signals LINEZ0 and LINEZ1 from line impedance monitoring circuit 77 whether the line 12 is in use. A negative response causes flow to proceed to box 277. A positive response causes flow to proceed to box 276.

Decision box 276 determines based on signal LS1 from line sense relay 86 whether the hook switch of local device 21B has been flashed. A negative response causes flow to proceed to box 254. A positive response causes flow to proceed to box 277.

Action box 277 causes the ring switch 76 via output signal K1 to have its contact move to the solid line position. Thus, if the local phone is taken off hook, box 277 gives the user access to the external line. Flow then proceeds to box 278.

Action box 278 causes the LED 83 to display a call-in-progress indication. Flow then proceeds to box 279.

Action box 279, in conjunction with input signal LS1 from line sense relay 86, waits for a local device ON HOOK status. Flow then proceeds to box 280.

Action box 280 causes the output signal K1 to return the contact of the ring switch 76 to its normal position. Flow then proceeds to box 254.

Action box 281 causes the LED 83 to display a call-in-progress indication. Flow then loops back to box 252.

Although a preferred embodiment of the present invention has been discussed in detail above, it will be apparent that various modifications thereto can be readily made. For example, although the preferred embodiment contemplates using seven LABS operable with control box 25, this number can be decreased or increased as desired. In addition, while FIG. 7 details timing which dedicates one bit per LAB, a binary coding scheme could be implemented to address any number of LABs. Also, various types of displays can replace LED's 38 and 83. Moreover, the various switching devices used in this system can be electromechanical, electrical, electronic, magnetic, optic and other applicable technologies. Of course, different frequencies from those disclosed herein may readily be used to implement the out-of-band signaling. All such modifications are intended to be included within the scope of the present invention as defined by the following claims.

We claim:

1. Telephone switching apparatus for coupling an external telephone line to a particular telephone device out of a plurality of telephone devices connected in, respectively, a plurality of internal telephone lines branching from said external telephone line comprising:
   switch means in each of said internal telephone lines for selectively blocking passage of signals between said external telephone line and said plurality of telephone devices;
   control means in one of the internal telephone lines for
      (a) detecting a ring signal on said external telephone line,
      (b) responding to identification signals on the external telephone line to identify said particular telephone device, and
      (c) generating a ringback signal and a selection signal which is unique to the particular telephone device;
      (d) providing said ringback and selection signals to said external telephone line and all of the plurality of internal telephone lines; and
   means in said internal telephone lines coupled to said switch means and responsive to said selection signal for generating a switching signal, said switch means being responsive to the switching signal for passing signals between said external telephone line and said particular telephone device through said switch means.

2. Telephone switching apparatus for coupling an external telephone line to a particular telephone device out of a plurality of telephone devices connected in, respectively, a plurality of internal telephone lines branching from said external telephone line, comprising:
   control means connected in one of said internal telephone lines for responding to a normal ring signal on said external telephone line and to an identification signal on said external telephone line, for generating respectively unique selection signals to at least two telephone devices in remaining ones of the plurality of internal telephone lines; and
   connecting means in the remaining ones of said plurality of internal telephone lines coupled between respective telephone devices and the external telephone line for normally blocking signals on said plurality of internal telephone lines received from said external line from reaching said respective telephone devices, and for responding to a selection signal from among said respectively unique selection signals and which is unique to said particular telephone device for passing signals from the external telephone line to said particular telephone device via an internal telephone line from said plurality of internal telephone lines associated with said particular telephone device.

3. Switching method in a telephone system for coupling an external telephone line to a particular telephone device out of a plurality of telephone devices connected in, respectively, a plurality of internal telephone lines branching from said external line, comprising the steps of:
- selectively blocking passage of signals between said external telephone line and said plurality of telephone devices;
- detecting a ring signal on said external telephone line;
- responding to identification signals on the external telephone line to identify said particular telephone device;
- generating a ringback signal and a selection signal which is unique to the particular telephone device;
- providing said ringback and selection signals to said external telephone line and all of the plurality of internal telephone lines; and
- generating a switching signal in response to said selection signal in the ringback signal for enabling passage of signals between said external telephone line and said particular telephone device.

4. Switching method in a telephone system for coupling an external telephone line to a particular telephone device out of a plurality of telephone devices connected in, respectively, a plurality of internal telephone lines branching from said external telephone line, comprising the steps of:
- responding to a normal ring signal on said external telephone line and to an identification signal on said external telephone line, for generating respectively unique selection signals to at least two telephone devices in remaining ones of the plurality of internal telephone lines; and
- normality blocking signals on said plurality of internal telephone lines received from said external telephone line from reaching said respective telephone devices, and responding to a selection signal from among said respectively unique selection signals and which is unique to said particular telephone device for passing signals from the external telephone line to said particular telephone device via an internal telephone line from among said plurality of internal telephone lines associated with said particular telephone device.

5. Telephone switching apparatus for coupling an external telephone line, entering a site, to a particular telephone device out of a plurality of telephone devices at the site connected in, respectively, a plurality of internal telephone lines branching from said external telephone line, comprising:
- a plurality of switch means connected, respectively, in said internal telephone lines for normally blocking passage of signals between said external telephone line and said plurality of telephone devices;
- control means in one of the internal telephone lines including:
  - (a) means for detecting a ring signal received at said site on said external telephone line,
  - (b) identifying means responding to identification signals received at the site on the external telephone line after said ring signal to identify said particular telephone device,
  - (c) means for generating a ringback signal on the external telephone line,
  - (d) means responsive to the identifying means for generating on the external telephone line a selection signal unique to the particular telephone device, and
  - (e) means responsive to the detecting means for coupling the identifying means, the ringback signal generating means, and the selection signal generating means to the external telephone line and all the internal telephone lines when a ring signal is detected; and
- one switch means out of said plurality of switch means, which is in the same internal telephone line as said particular telephone device, being responsive to the selection signal generated for the particular telephone device for ringing said particular telephone device and, when the particular telephone device goes into an off-hook condition, for terminating said normal signal blocking condition to pass signals between said external telephone line and said particular telephone device through said one switch means.

6. The telephone switching apparatus of claim 5, wherein said means for generating a ringback signal and said means for generating a selection signal produce a combined signal.

7. The telephone switching apparatus of claim 6, wherein said means for generating a selection signal includes means to modulate the ringback signal.

8. The telephone switching apparatus of claim 5, wherein said means for generating a selection signal generates a selection signal outside of the audible range of frequencies.

9. The telephone switching apparatus of claim 5, wherein the identification signals received from said external line are compared by said identifying means with predetermined identification signals set, respectively, for said plurality of telephone devices.

10. The telephone switching apparatus of claim 5, further comprising time delay means having a preset time interval, means responsive to said identifying means and said time delay means for generating an audible message on the external telephone line when said preset time interval expires without an identification signal being identified, said time delay means being triggered by said coupling means to initiate said preset time interval upon the identifying means being coupled to the external telephone line, said coupling means also coupling the audible message generating means to said external telephone lines.

11. The telephone switching apparatus of claim 5, further comprising exclusion means responsive to any one of said plurality of telephone devices being connected through its corresponding switch means to the external telephone line for inhibiting any other of said plurality of telephone devices from being connected through its corresponding switch means to the external telephone line.

12. The telephone switching apparatus of claim 11, further comprising override means to selectively deactivate said exclusion means and thereby enable at least two of said plurality of telephone devices to be simultaneously connected to said external telephone line by their respective corresponding switch means.

13. The telephone switching apparatus of claim 5, further comprising means responsive to the identification signal for displaying an indication related to said particular telephone device.

14. The telephone switching apparatus of claim 5, wherein each of said plurality of switch means includes: ringing means responsive to the section signal for generating a local ring signal for its corresponding telephone device, means responsive to its corresponding telephone device going into an off-hook mode to generate an actuation signal, a switch connected between said corresponding telephone device and said external telephone line, said switch normally breaking a connection between said corresponding telephone device and the external telephone line, and means responsive to said actuation signal for actuating said switch to complete the connection between said external telephone line and said corresponding telephone device.

15. The telephone switching apparatus of claim 14, wherein said ringing means includes means for storing a unique preset signal, means for comparing said preset signal with said selection signal to generate a control signal when the preset signal and the selection signal match, and means responsive to the control signal for generating said local ring signal.

16. The telephone switching apparatus of claim 15, wherein said ringing means of said switch means generates a local ring signal when the coupling means of said control means fails to function within a preset number of rings related to said ring signal on said external telephone line.

17. The telephone switching apparatus of claim 16, wherein each of said plurality of switch means includes a display means responsive to said selection signal for displaying an indication related to said particular telephone device.

18. The telephone switching apparatus of claim 5, wherein each of said plurality of switch means includes a display means responsive to said selection signal for displaying an indication related to said particular telephone device.

19. The telephone switching apparatus of claim 5, wherein said switch means rings all the plurality of telephone devices when the coupling means of said control means fails to function within a preset number of rings related to said ring signal on said external telephone line.

20. Telephone switching apparatus for coupling at least one external telephone line, entering a site, to a particular telephone device out of a plurality of telephone devices at said site connected in, respectively, a plurality of internal telephone lines coupled to said at least one external telephone line, comprising:
control means connected in one of said plurality of internal telephone lines, and said plurality of telephone devices being connected in other of said plurality of internal telephone lines, each control means generating on the at least one external telephone line a plurality of selection signals respectively unique to said plurality of telephone devices, said control means generating a unique selection signal in response to an identification signal received at said site on said at least one external telephone line corresponding to said particular telephone device; and
a plurality of connecting means connected, respectively, in said other internal telephone lines for normally blocking signals on said at least one external telephone line from reaching said plurality of telephone devices, and for responding to a selection signal unique to said particular telephone device for actuating its corresponding connecting means to ring said particular telephone device and, when it goes into an off-hook condition, to pass signals from the at least one external telephone line to said particular telephone device via its corresponding internal telephone line.

21. The telephone switching apparatus of claim 20, wherein said selection signal is combined with a ringback signal.

22. The telephone switching apparatus of claim 20, wherein said control means generates a selection signal by modulating the ringback signal.

23. The telephone switching apparatus of claim 20, wherein said control means generates a selection signal outside of the audible range of frequencies.

24. The telephone switching apparatus of claim 20, further comprising time delay means having a preset time interval, means responsive to said control means and said time delay means for generating an audible message on the at least one external telephone line when said preset time interval expires without an identification signal being received, said time delay means being triggered in response to a ring signal received on said at least one external telephone line to initiate said preset time interval.

25. The telephone switching apparatus of claim 20, further comprising exclusion means responsive to any one of said plurality of telephone devices being connected through its corresponding connecting means to the at least one external telephone line for inhibiting any other of said plurality of telephone devices from being connected through its corresponding connecting means to the at least one external telephone line.

26. The telephone switching apparatus of claim 25, further comprising override means to selectively deactivate said exclusion means and thereby enable at least two of said plurality of telephone devices to be simultaneously connected to said at least one external telephone line by their respective corresponding connecting means.

27. The telephone switching apparatus of claim 20, wherein each of said plurality of connecting means includes: ringing means responsive to the selection signal for generating a local ring signal for its corresponding telephone device, means responsive to its corresponding telephone device going into an off-hook mode to generate an actuation signal, a switch connected between said corresponding telephone device and said at least one external telephone line, said switch normally breaking a connection between said corresponding telephone device and the at least one external telephone line, and means responsive to said actuation signal for actuating said switch to complete the connection between said at least one external telephone line and said corresponding telephone device.

28. The telephone switching apparatus of claim 27, wherein said ringing means includes means for storing a unique preset signal, means for comparing said preset signal with said selection signal to generate a control signal when the preset signal and the selection signal match, and means responsive to the control signal for generating said local ring signal.

29. The telephone switching apparatus of claim 28, wherein said ringing means of said connecting means generates a local ring signal when the control means fails to function within a preset number of rings related to a ring signal received on said external telephone line.

30. The telephone switching apparatus of claim 20, wherein said at least one external telephone line comprises a plurality of telephone lines including a main external line with which said control means is associated, and further comprising a plurality of expansion means corresponding, respectively, to said plurality of telephone lines, said expansion means comprising: interface means coupled to said control means to identify to the control means which of said plurality of external telephone lines is receiving a ring signal, a bypass switch means for normally coupling the main external telephone line to said control means, the bypass switch means for all of said expansion means being connected in series with each other, and means for switching the bypass switch means to couple the control means to only the external telephone line from among the plurality of external telephone lines which is receiving a ring signal.

* * * * *